US012737152B2

(12) United States Patent
Hartung et al.

(10) Patent No.: US 12,737,152 B2
(45) **Date of Patent: *Sep. 15, 2026**

(54) PLAYBACK DEVICE CALIBRATION BASED ON REPRESENTATIVE SPECTRAL CHARACTERISTICS

(71) Applicant: Sonos, Inc., Santa Barbara, CA (US)

(72) Inventors: Klaus Hartung, Boston, MA (US); Simon Jarvis, Cambridge, MA (US); Tim Sheen, Brighton, MA (US); Chris Davies, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/674,039

(22) Filed: May 24, 2024

(65) Prior Publication Data

US 2025/0028502 A1 Jan. 23, 2025

Related U.S. Application Data

(63) Continuation of application No. 17/810,549, filed on Jul. 1, 2022, now Pat. No. 11,995,376, which is a (Continued)

(51) Int. Cl.
*G06F 3/16* (2006.01)
*H04R 29/00* (2006.01)
*H04S 7/00* (2006.01)

(52) U.S. Cl.
CPC .......... *G06F 3/165* (2013.01); *H04R 29/007* (2013.01); *H04S 7/305* (2013.01); (Continued)

(58) Field of Classification Search
None
See application file for complete search history.

(56) References Cited

U.S. PATENT DOCUMENTS 4,885,782 A 12/1989 Eberbach
5,586,172 A 12/1996 Sakurai et al.
(Continued)

FOREIGN PATENT DOCUMENTS

CN 107465974 A 12/2017
EP 3142107 A1 3/2017
(Continued)

OTHER PUBLICATIONS

Notice of Allowance mailed on Jun. 22, 2023, issued in connection with U.S. Appl. No. 17/407,793, filed Aug. 20, 2021, 10 pages.
(Continued)

*Primary Examiner* — Hemant S Patel
(74) *Attorney, Agent, or Firm* — FORTEM IP LLP

(57) ABSTRACT

A computing device may maintain a database of representative spectral characteristics. The computing device may also receive particular spectral data associated with a particular playback environment corresponding to the particular playback device. Based on the particular spectral data, the computing device may identify one of the representative spectral characteristics from the database that substantially matches the particular spectral data, and then identify, in the database, an audio processing algorithm based on a) the identified representative spectral characteristic and b) at least one characteristic of the particular playback device. The computing device may then transmit, to the particular playback device, data indicating the identified audio processing algorithm.

20 Claims, 8 Drawing Sheets

| Representative Spectral Characteristic | Playback Device Characteristic (Model) | Audio Processing Algorithm |
|---|---|---|
| 801a $h_{room}^{-1}(t)$-1 | PLAY: 3 802a | $w_1$, $x_1$, $y_1$, and $z_1$ 803a |
| 801b $h_{room}^{-1}(t)$-2 | PLAY: 3 802b | $w_2$, $x_2$, $y_2$, and $z_2$ 803b |
| 801c $h_{room}^{-1}(t)$-3 | PLAY: 3 802c | $w_3$, $x_3$, $y_3$, and $z_3$ 803c |
| 801d $h_{room}^{-1}(t)$-4 | PLAY: 3 802d | $w_4$, $x_4$, $y_4$, and $z_4$ 803d |
| . . . | . . . | . . . |

Related U.S. Application Data continuation of application No. 17/135,308, filed on Dec. 28, 2020, now Pat. No. 11,379,179, which is a continuation of application No. 16/555,832, filed on Aug. 29, 2019, now Pat. No. 10,884,698, which is a continuation of application No. 15/865,221, filed on Jan. 8, 2018, now Pat. No. 10,402,154, which is a continuation of application No. 15/089,004, filed on Apr. 1, 2016, now Pat. No. 9,864,574.

(52) U.S. Cl.
CPC .. *H04R 2227/003* (2013.01); *H04R 2227/005* (2013.01); *H04R 2227/007* (2013.01)

(56) References Cited

U.S. PATENT DOCUMENTS 5,717,768 A 2/1998 Laroche
5,857,172 A 1/1999 Rozak
6,548,967 B1 4/2003 Dowling et al.
6,631,179 B1 10/2003 Sifuentes
D559,197 S 1/2008 Lim et al.
D575,801 S 8/2008 Kusano et al.
D582,429 S 12/2008 Kusano et al.
7,792,311 B1 9/2010 Holmgren et al.
8,239,206 B1 8/2012 Lebeau et al.
8,325,909 B2 12/2012 Tashev et al.
8,340,975 B1 12/2012 Rosenberger
8,423,893 B2 4/2013 Ramsay et al.
8,762,156 B2 6/2014 Chen
8,948,426 B2 2/2015 Thomasson et al.
9,002,024 B2 4/2015 Nakadai et al.
9,014,380 B2 4/2015 Gautama et al.
9,047,857 B1 6/2015 Barton
9,088,336 B2 7/2015 Mani et al.
9,094,768 B2 7/2015 LaBosco
9,148,742 B1 9/2015 Koulomzin et al.
9,219,460 B2 * 12/2015 Bush ........................ H04R 3/04
9,288,596 B2 3/2016 Gossain et al.
9,332,371 B2 5/2016 De Bruijn
9,348,824 B2 5/2016 Coburn, IV
9,355,555 B2 5/2016 Reichert et al.
9,401,058 B2 7/2016 De La Fuente et al.
9,431,021 B1 8/2016 Scalise et al.
9,431,029 B2 8/2016 Yook et al.
9,438,996 B2 9/2016 Maher et al.
9,456,279 B1 9/2016 Murdoch
9,491,499 B2 11/2016 Wagenaar et al.
9,516,444 B2 12/2016 Riggi et al.
9,569,073 B2 2/2017 Tan
9,575,615 B1 2/2017 Nicholls et al.
9,596,531 B1 3/2017 Zhang
9,628,911 B2 4/2017 Rabinowitz et al.
9,632,748 B2 4/2017 Faaborg
9,654,545 B2 5/2017 Gossain
9,672,812 B1 6/2017 Watanabe et al.
9,691,384 B1 6/2017 Wang et al.
9,706,319 B2 7/2017 Peters et al.
9,769,580 B2 9/2017 Rabinowitz et al.
9,817,549 B2 11/2017 Chandrasekaran
9,842,584 B1 12/2017 Hart et al.
9,866,964 B1 1/2018 Haskin et al.
9,898,250 B1 2/2018 Williams et al.
9,900,723 B1 2/2018 Choisel et al.
9,916,839 B1 3/2018 Scalise et al.
9,997,151 B1 6/2018 Ayrapetian et al.
10,002,259 B1 6/2018 Mai
10,007,481 B2 6/2018 Daly et al.
10,028,069 B1 7/2018 Lang
10,074,371 B1 9/2018 Wang et al.
10,097,919 B2 10/2018 Jarvis et al.
10,114,605 B2 10/2018 Gossain et al.
10,152,969 B2 12/2018 Reilly et al.
10,200,800 B2 2/2019 Thomson
10,248,376 B2 4/2019 Keyser-Allen et al.
10,249,205 B2 4/2019 Hammersley et al.
10,275,213 B2 4/2019 Daly
10,304,440 B1 5/2019 Panchapagesan et al.
10,440,492 B2 10/2019 Crockett
10,555,077 B2 2/2020 Jarvis et al.
10,567,900 B2 2/2020 Tanaka et al.
10,567,901 B2 2/2020 Po et al.
10,586,534 B1 3/2020 Argyropoulos et al.
10,720,173 B2 7/2020 Freeman et al.
10,811,015 B2 10/2020 Smith et al.
10,817,249 B2 10/2020 Tanaka et al.
10,847,137 B1 11/2020 Mandal et al.
10,853,027 B2 12/2020 Shih et al.
10,863,295 B2 12/2020 Bush
10,904,691 B2 1/2021 Tu et al.
10,986,460 B2 4/2021 Reilly et al.
11,062,705 B2 7/2021 Watanabe et al.
11,184,704 B2 11/2021 Jarvis et al.
11,184,726 B2 11/2021 Hartung et al.
11,197,117 B2 12/2021 Reilly et al.
11,295,754 B2 4/2022 Eubank et al.
11,356,520 B2 6/2022 Starobin et al.
11,513,216 B1 11/2022 Kamath Koteshwara et al.
11,540,073 B2 12/2022 Oishi et al.
11,696,074 B2 7/2023 Woo et al.
11,696,081 B2 7/2023 Bush
11,700,139 B2 7/2023 Drake
11,727,936 B2 8/2023 Smith et al.
11,736,877 B2 8/2023 Jarvis et al.
11,803,350 B2 10/2023 Sheen
11,816,393 B2 11/2023 Vega-Zayas et al.
11,825,290 B2 11/2023 Reilly et al.
11,832,068 B2 11/2023 Jarvis et al.
11,849,299 B2 12/2023 Reilly et al.
11,889,276 B2 1/2024 McPherson et al.
11,995,376 B2 * 5/2024 Hartung .................. H04S 7/305
2002/0054685 A1 5/2002 Avendano et al.
2002/0055950 A1 5/2002 Witteman
2002/0169583 A1 11/2002 Gutta et al.
2004/0153321 A1 8/2004 Chung et al.
2005/0129254 A1 6/2005 Connor et al.
2005/0131558 A1 6/2005 Braithwaite et al.
2006/0013197 A1 1/2006 Anderson
2006/0093998 A1 5/2006 Vertegaal
2006/0161964 A1 7/2006 Chung
2006/0209197 A1 9/2006 Vanhatalo
2006/0238877 A1 10/2006 Ashkenazi et al.
2007/0022207 A1 1/2007 Millington
2007/0135061 A1 6/2007 Buck et al.
2008/0031475 A1 2/2008 Goldstein
2008/0045140 A1 2/2008 Korhonen
2008/0107128 A1 5/2008 Lo et al.
2008/0146289 A1 6/2008 Korneluk et al.
2008/0147461 A1 6/2008 Lee et al.
2008/0160977 A1 7/2008 Ahmaniemi et al.
2008/0192946 A1 8/2008 Faller
2008/0268823 A1 10/2008 Shalev et al.
2008/0316863 A1 12/2008 Walley
2009/0013255 A1 1/2009 Yuschik et al.
2009/0169025 A1 7/2009 Chen
2009/0175216 A1 7/2009 Bozarth et al.
2009/0175510 A1 7/2009 Grim, III et al.
2009/0204410 A1 8/2009 Mozer et al.
2009/0214048 A1 8/2009 Stokes, III et al.
2009/0232481 A1 9/2009 Baalbergen et al.
2009/0235236 A1 9/2009 Nickerson et al.
2009/0326949 A1 12/2009 Douthitt et al.
2010/0114944 A1 5/2010 Adler et al.
2010/0131642 A1 5/2010 Chalikouras et al.
2010/0136952 A1 6/2010 Rofougaran
2010/0260348 A1 10/2010 Bhow et al.
2010/0290643 A1 11/2010 Mihelich et al.
2010/0299639 A1 11/2010 Ramsay et al.
2010/0317332 A1 12/2010 Bathiche et al.
2010/0329472 A1 12/2010 Nakadai et al.
2011/0002471 A1 1/2011 Wihardja et al.
2011/0019833 A1 1/2011 Kuech et al.
2011/0044461 A1 2/2011 Kuech et al.

(56) References Cited

U.S. PATENT DOCUMENTS

2011/0157168 A1 6/2011 Bennett et al.
2011/0164188 A1 7/2011 Karaoguz et al.
2011/0176687 A1 7/2011 Birkenes
2011/0216093 A1 9/2011 Griffin
2011/0267985 A1 11/2011 Wilkinson et al.
2011/0286601 A1 11/2011 Fukui et al.
2012/0027218 A1 2/2012 Every et al.
2012/0076308 A1 3/2012 Kuech et al.
2012/0224457 A1 9/2012 Kim et al.
2012/0237047 A1 9/2012 Neal et al.
2012/0254220 A1 10/2012 Verthein et al.
2012/0270653 A1 10/2012 Kareemi et al.
2013/0024880 A1 1/2013 Moloney-Egnatios et al.
2013/0080167 A1 3/2013 Mozer
2013/0080171 A1 3/2013 Mozer et al.
2013/0083948 A1 4/2013 Schmidt
2013/0111347 A1 5/2013 Reilly et al.
2013/0129100 A1 5/2013 Sorensen
2013/0170363 A1 7/2013 Millington et al.
2013/0177188 A1 7/2013 Apfel et al.
2013/0283169 A1 10/2013 Van Wie
2013/0289994 A1 10/2013 Newman et al.
2013/0308794 A1 11/2013 Jochim et al.
2013/0336499 A1 12/2013 Beckhardt et al.
2013/0339028 A1 12/2013 Rosner et al.
2014/0075308 A1 3/2014 Sanders et al.
2014/0093093 A1 4/2014 Dusan et al.
2014/0094151 A1 4/2014 Klappert et al.
2014/0112502 A1 4/2014 Lee
2014/0122075 A1 5/2014 Bak et al.
2014/0154993 A1 6/2014 Bates et al.
2014/0170979 A1 6/2014 Samanta Singhar
2014/0180697 A1 6/2014 Torok et al.
2014/0188476 A1 7/2014 Li et al.
2014/0244712 A1 8/2014 Walters et al.
2014/0270216 A1 9/2014 Tsilfidis et al.
2014/0270248 A1 9/2014 Ivanov et al.
2014/0274203 A1 9/2014 Ganong, III et al.
2014/0278343 A1 9/2014 Tran
2014/0363022 A1 12/2014 Dizon et al.
2015/0006176 A1 1/2015 Pogue et al.
2015/0018992 A1 1/2015 Griffiths et al.
2015/0023521 A1 1/2015 Jones et al.
2015/0039303 A1 2/2015 Lesso et al.
2015/0039310 A1 2/2015 Clark et al.
2015/0039311 A1 2/2015 Clark et al.
2015/0051723 A1 2/2015 Bates et al.
2015/0073807 A1 3/2015 Kumar
2015/0086034 A1 3/2015 Lombardi et al.
2015/0106085 A1 4/2015 Lindahl
2015/0112672 A1 4/2015 Giacobello et al.
2015/0124975 A1 5/2015 Pontoppidan
2015/0126255 A1 5/2015 Yang et al.
2015/0154953 A1 6/2015 Bapat et al.
2015/0200923 A1 7/2015 Triplett
2015/0215382 A1 7/2015 Arora et al.
2015/0222563 A1 8/2015 Burns et al.
2015/0271593 A1 9/2015 Sun et al.
2015/0350766 A1 12/2015 Schobel et al.
2016/0011846 A1* 1/2016 Sheen .................... H04S 7/307 700/94
2016/0014535 A1 1/2016 Wilberding et al.
2016/0027440 A1 1/2016 Gelfenbeyn et al.
2016/0034448 A1 2/2016 Tran
2016/0066087 A1 3/2016 Solbach et al.
2016/0093281 A1 3/2016 Kuo et al.
2016/0098393 A1 4/2016 Hebert
2016/0098992 A1 4/2016 Renard et al.
2016/0118048 A1 4/2016 Heide
2016/0148612 A1 5/2016 Guo et al.
2016/0154089 A1 6/2016 Altman
2016/0155443 A1 6/2016 Khan et al.
2016/0192100 A1 6/2016 Rabinowitz et al.
2016/0241907 A1 8/2016 Pearson
2016/0316502 A1 10/2016 DeCicco
2017/0070826 A1 3/2017 Pedersen et al.
2017/0084278 A1 3/2017 Jung
2017/0084292 A1 3/2017 Yoo
2017/0090864 A1 3/2017 Jorgovanovic
2017/0103754 A1 4/2017 Higbie et al.
2017/0110130 A1 4/2017 Sharifi et al.
2017/0110144 A1 4/2017 Sharifi et al.
2017/0236512 A1 8/2017 Williams et al.
2017/0242653 A1 8/2017 Lang et al.
2017/0242657 A1 8/2017 Jarvis et al.
2017/0269975 A1 9/2017 Wood et al.
2017/0287496 A1 10/2017 Heitkamp et al.
2017/0332168 A1 11/2017 Moghimi et al.
2017/0353789 A1 12/2017 Kim et al.
2017/0358313 A1 12/2017 Shih
2017/0365247 A1 12/2017 Ushakov
2018/0033428 A1 2/2018 Kim et al.
2018/0033429 A1 2/2018 Makke et al.
2018/0039530 A1 2/2018 Ciabarra, Jr. et al.
2018/0040324 A1 2/2018 Wilberding
2018/0061409 A1 3/2018 Valentine et al.
2018/0084367 A1 3/2018 Greff et al.
2018/0091898 A1 3/2018 Yoon et al.
2018/0096460 A1 4/2018 Tripp
2018/0096678 A1 4/2018 Zhou et al.
2018/0108351 A1 4/2018 Beckhardt et al.
2018/0132298 A1 5/2018 Birnam et al.
2018/0137857 A1 5/2018 Zhou et al.
2018/0165055 A1 6/2018 Yu et al.
2018/0167981 A1 6/2018 Jonna et al.
2018/0182390 A1 6/2018 Hughes et al.
2018/0182410 A1 6/2018 Kaskari et al.
2018/0197533 A1 7/2018 Lyon et al.
2018/0233137 A1 8/2018 Torok et al.
2018/0277107 A1 9/2018 Kim
2018/0277113 A1 9/2018 Hartung et al.
2018/0336892 A1 11/2018 Kim et al.
2018/0350356 A1 12/2018 Garcia
2018/0350379 A1 12/2018 Wung et al.
2018/0352334 A1 12/2018 Family et al.
2018/0358019 A1 12/2018 Mont-Reynaud
2018/0367944 A1 12/2018 Heo et al.
2019/0013019 A1 1/2019 Lawrence
2019/0035404 A1 1/2019 Gabel et al.
2019/0066710 A1 2/2019 Bryan et al.
2019/0073999 A1 3/2019 Prémont et al.
2019/0081507 A1 3/2019 Ide
2019/0104373 A1 4/2019 Wodrich et al.
2019/0122662 A1 4/2019 Chang et al.
2019/0156847 A1 5/2019 Bryan et al.
2019/0172476 A1 6/2019 Wung et al.
2019/0237069 A1 8/2019 Zhao et al.
2019/0237089 A1 8/2019 Shin
2019/0251960 A1 8/2019 Maker et al.
2019/0259408 A1 8/2019 Freeman et al.
2019/0287536 A1 9/2019 Sharifi et al.
2019/0295563 A1 9/2019 Kamdar et al.
2019/0311715 A1 10/2019 Pfeffinger et al.
2019/0311718 A1 10/2019 Huber et al.
2019/0311722 A1 10/2019 Caldwell
2019/0318729 A1 10/2019 Chao et al.
2019/0325870 A1 10/2019 Mitic
2019/0325888 A1 10/2019 Geng
2019/0341037 A1 11/2019 Bromand et al.
2019/0341038 A1 11/2019 Bromand et al.
2019/0371324 A1 12/2019 Powell et al.
2019/0392832 A1 12/2019 Mitsui et al.
2020/0090644 A1 3/2020 Klingler et al.
2020/0090646 A1 3/2020 Smith et al.
2020/0098354 A1 3/2020 Lin et al.
2020/0135194 A1 4/2020 Jeong
2021/0118429 A1 4/2021 Shan
2021/0287670 A1 9/2021 Regan et al.
2021/0295833 A1 9/2021 Rastrow et al.
2022/0036882 A1 2/2022 Ahn et al.

(56) References Cited

U.S. PATENT DOCUMENTS

| | | | |
|---|---|---|---|
| 2022/0083136 A1 | 3/2022 | DeLeeuw | |
| 2023/0362566 A1 | 11/2023 | Bush | |

FOREIGN PATENT DOCUMENTS

| | | | |
|---|---|---|---|
| JP | 2001286000 | A | 10/2001 |
| JP | 2002067815 | A | 3/2002 |
| JP | 2003223188 | A | 8/2003 |
| JP | 2004163590 | A | 6/2004 |
| JP | 2006086380 | A | 3/2006 |
| JP | 2008217444 | A | 9/2008 |
| JP | 2009288260 | A | 12/2009 |
| JP | 2014519274 | A | 8/2014 |
| JP | 2015022268 | A | 2/2015 |
| JP | 2016009193 | A | 1/2016 |
| JP | 2016024652 | A | 2/2016 |
| JP | 2016095383 | A | 5/2016 |
| JP | 2016524193 | A | 8/2016 |
| JP | 2016212312 | A | 12/2016 |
| JP | 2018500529 | A | 1/2018 |
| JP | 2020048867 | A | 4/2020 |
| JP | 2022001030 | A | 1/2022 |
| JP | 2022046752 | A | 3/2022 |
| KR | 100966415 | B1 | 6/2010 |
| KR | 20120111130 | A | 10/2012 |
| KR | 20130050987 | A | 5/2013 |
| KR | 20140111859 | A | 9/2014 |
| KR | 20160005045 | A | 1/2016 |
| KR | 20160007527 | A | 1/2016 |
| KR | 20160101198 | A | 8/2016 |
| KR | 20160145634 | A | 12/2016 |
| WO | 2014040667 | A1 | 3/2014 |
| WO | 2016003509 | A1 | 1/2016 |
| WO | 2016014686 | A1 | 1/2016 |
| WO | 2016085775 | A2 | 6/2016 |
| WO | 2016118327 | A1 | 7/2016 |
| WO | 2016171956 | A1 | 10/2016 |
| WO | 2016189285 | A1 | 12/2016 |
| WO | 2017058654 | A1 | 4/2017 |
| WO | 2017147081 | A1 | 8/2017 |
| WO | 2020006410 | A1 | 1/2020 |
| WO | 2020252163 | A1 | 12/2020 |
| WO | 2021030334 | A1 | 2/2021 |

OTHER PUBLICATIONS

Notice of Allowance mailed on Mar. 22, 2023, issued in connection with U.S. Appl. No. 17/662,282, filed May 6, 2022, 5 pages.
Notice of Allowance mailed on Aug. 23, 2023, issued in connection with U.S. Appl. No. 18/308,016, filed Apr. 27, 2023, 13 pages.
Notice of Allowance mailed on Jul. 24, 2024, issued in connection with U.S. Appl. No. 18/456,941, filed Aug. 28, 2023, 11 pages.
Notice of Allowance mailed on Jun. 24, 2024, issued in connection with U.S. Appl. No. 18/447,075, filed Aug. 9, 2023, 11 pages.
Notice of Allowance mailed on Apr. 26, 2023, issued in connection with U.S. Appl. No. 18/058,667, filed Nov. 23, 2022, 8 pages.
Notice of Allowance mailed on Dec. 26, 2023, issued in connection with U.S. Appl. No. 18/066,077, filed Dec. 14, 2022, 6 pages.
Notice of Allowance mailed on Jul. 26, 2024, issued in connection with U.S. Appl. No. 18/408,865, filed Jan. 10, 2024, 9 pages.
Notice of Allowance mailed on Feb. 27, 2023, issued in connection with U.S. Appl. No. 17/107,157, filed Nov. 30, 2020, 13 pages.
Notice of Allowance mailed on Jun. 27, 2025, issued in connection with U.S. Appl. No. 18/657,019, filed May 7, 2024, 5 pages.
Notice of Allowance mailed on Aug. 28, 2024, issued in connection with U.S. Appl. No. 18/432,733, filed Feb. 5, 2024, 10 pages.
Notice of Allowance mailed on Jun. 28, 2023, issued in connection with U.S. Appl. No. 18/189,876, filed Mar. 24, 2023, 20 pages.
Notice of Allowance mailed on Mar. 28, 2023, issued in connection with U.S. Appl. No. 18/058,659, filed Nov. 23, 2022, 10 pages.
Notice of Allowance mailed on Aug. 29, 2023, issued in connection with U.S. Appl. No. 17/804,372, filed May 27, 2022, 9 pages.
Notice of Allowance mailed on Jul. 29, 2024, issued in connection with U.S. Appl. No. 18/459,982, filed Sep. 1, 2023, 08 pages.
Notice of Allowance mailed on Mar. 29, 2023, issued in connection with U.S. Appl. No. 17/807,595, filed Jun. 17, 2022, 6 pages.
Notice of Allowance mailed on Jul. 3, 2024, issued in connection with U.S. Appl. No. 18/507,713, filed Nov. 13, 2023, 11 pages.
Notice of Allowance mailed on Jul. 31, 2024, issued in connection with U.S. Appl. No. 18/192,452, filed Mar. 29, 2023, 8 pages.
Notice of Allowance mailed on Jul. 31, 2024, issued in connection with U.S. Appl. No. 18/453,052, filed Aug. 21, 2023, 9 pages.
Notice of Allowance mailed on Apr. 5, 2023, issued in connection with U.S. Appl. No. 17/562,465, filed Dec. 27, 2021, 10 pages.
Notice of Allowance mailed on Aug. 7, 2024, issued in connection with U.S. Appl. No. 18/478,241, filed Sep. 29, 2023, 10 pages.
Notice of Allowance mailed on Jun. 7, 2024, issued in connection with U.S. Appl. No. 18/316,434, filed May 12, 2023, 9 pages.
PaulStamatiou., "Review: Sonos ZonePlayer S5 All-In-One Wireless Music System," PaulStamatiou.com, 2009, pp. 1-11. acquired at https://web.archive.org/web/20101127024648/https://paulstamatiou.com/review-sonos-zoneplayer-s5-all-in-one-wireless-music-system.
Rosenblatt, Jonathan et al. On the Optimality of Averaging in Distributed Statistical Learning. Information and Inference, Department of Computer Science and Applied Mathematics, Weizmann Institute of Science, vol. 5, No. 4, Jun. 16, 2015, 30 pages. Retrieved from the Internet: URL:https://arxiv.org/pdf/1407.2724.pdf.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Supplemental Notice of Allowance mailed on Oct. 8, 2025, issued in connection with U.S. Appl. No. 18/424,041, filed Jan. 26, 2024, 03 pages.
The Absolute Sound., "Sonos Multi-Room Music System," 2009, pp. 1-8. Review: https://www.theabsolutesound.com/articles/sonos-multi-room-music-system/.
802.15 Wikipedia page available 2011 (Year: 2011).
Advisory Action mailed on Apr. 24, 2024, issued in connection with U.S. Appl. No. 17/807,270, filed Jun. 16, 2022, 3 pages.
Australian Patent Office, Australian Examination Report Action mailed on Aug. 16, 2024, issued in connection with Australian Application No. 2023248160, 2 pages.
Australian Patent Office, Australian Examination Report Action mailed on Sep. 18, 2024, issued in connection with Australian Application No. 2020218258, 3 pages.
Australian Patent Office, Australian Examination Report Action mailed on Aug. 19, 2024, issued in connection with Australian Application No. 2023237094, 2 pages.
Australian Patent Office, Australian Examination Report Action mailed on Jan. 23, 2025, issued in connection with Australian Application No. 2020329905, 3 pages.
Australian Patent Office, Australian Examination Report Action mailed on Jul. 29, 2024, issued in connection with Australian Application No. 2023237192, 3 pages.
Bahl P., et al., "Radar: An In-Building RF-based User Location and Tracking System," IEEE c2000, 2000, pp. 775-784.
Bluetooth Wikipedia page available 2011 (Year: 2011).
Bohn, Dieter. The Verge. "Amazon Creates a Huge Alliance to Demand Voice Assistant Compatibility." Sep. 24, 2019, 15 pages. Retrieved from the Internet: URL: https://www.theverge.com/2019/9/24/20881321/amazon-voice-interoperability-initiative-a1exa-microsoft-baidu-inte1-qua1commspotify-assistants.
Canadian Patent Office, Canadian Examination Report mailed on Oct. 1, 2024, issued in connection with Canadian Application No. 3123601, 4 pages.
Canadian Patent Office, Canadian Examination Report mailed on Aug. 12, 2024, issued in connection with Canadian Application No. 3067776, 3 pages.
Canadian Patent Office, Canadian Examination Report mailed on Oct. 13, 2023, issued in connection with Canadian Application No. 3148021, 8 pages.
Canadian Patent Office, Canadian Examination Report mailed on May 17, 2024, issued in connection with Canadian Application No. 3148021, 5 pages.

(56) References Cited

OTHER PUBLICATIONS

Canadian Patent Office, Canadian Examination Report mailed on Jun. 18, 2024, issued in connection with Canadian Application No. 3084279, 4 pages.
Corrected Notice of Allowance mailed on Aug. 15, 2025, issued in connection with U.S. Appl. No. 18/487,290, filed Oct. 16, 2023, 04 pages.
European Patent Office, European EPC Article 94.3 and Rule 164(2)(b) mailed on Nov. 23, 2023, issued in connection with European Application No. 20761443.9, 15 pages.
European Patent Office, European EPC Article 94.3 mailed on Dec. 19, 2024, issued in connection with European Application No. 22153523, 4 pages.
European Patent Office, European EPC Article 94.3 mailed on Feb. 2, 2024, issued in connection with European Application No. 21171959.6, 9 pages.
European Patent Office, European EPC Article 94.3 mailed on Jul. 22, 2024, issued in connection with European Application No. 23188226.7, 9 pages.
European Patent Office, European EPC Article 94.3 mailed on Feb. 3, 2023, issued in connection with European Application No. 19765920.4, 5 pages.
European Patent Office, European EPC Article 94.3 mailed on Jan. 30, 2024, issued in connection with European Application No. 22155834.9, 4 pages.
European Patent Office, European EPC Article 94.3 mailed on Jun. 4, 2024, issued in connection with European Application No. 21180778.9, 5 pages.
European Patent Office, European Extended Search Report mailed on Dec. 6, 2024, issued in connection with European Application No. 24174559.5, 12 pages.
European Patent Office, European Extended Search Report mailed on Apr. 15, 2024, issued in connection with European Application No. 23212793.6, 9 pages.
European Patent Office, European Extended Search Report mailed on Aug. 2, 2025, issued in connection with European Application No. 24219860.4, 11 pages.
European Patent Office, European Extended Search Report mailed on Feb. 24, 2025, issued in connection with European Application No. 24192454.7, 11 pages.
European Patent Office, European Extended Search Report mailed on Jul. 9, 2024, issued in connection with European Application No. 24162741.3, 12 pages.
European Patent Office, European Search Report mailed on Oct. 17, 2023, issued in connection with European Application No. 23178432.3, 8 pages.
European Patent Office, Summons to Attend Oral Proceedings mailed on Sep. 1, 2025, issued in connection with European Application No. 21171959.6, 9 pages.
European Patent Office, Summons to Attend Oral Proceedings mailed on Jun. 26, 2024, issued in connection with European Application No. 19740292.8, 10 pages.
European Patent Office, Summons to Attend Oral Proceedings mailed on Nov. 29, 2024, issued in connection with European Application No. 21193616.6, 9 pages.
European Patent Office, Summons to Attend Oral Proceedings mailed on Aug. 5, 2025, issued in connection with European Application No. 20761443.9, 12 pages.
European Patent Office, Summons to Attend Oral Proceedings mailed on Aug. 6, 2024, issued in connection with European Application No. 18789515.6, 8 pages.
Final Office Action mailed on Aug. 1, 2025, issued in connection with U.S. Appl. No. 19/029,744 , filed Jan. 17, 2025, 27 pages.
Final Office Action mailed on Oct. 2, 2025, issued in connection with U.S. Appl. No. 18/189,863, filed Mar. 24, 2023, 33 pages.
Final Office Action mailed on Sep. 5, 2024, issued in connection with U.S. Appl. No. 18/343,487, filed Jun. 28, 2023, 12 pages.
Final Office Action mailed on Aug. 6, 2025, issued in connection with U.S. Appl. No. 19/028,592, filed Jan. 17, 2025, 35 pages.
Final Office Action mailed on Oct. 7, 2025, issued in connection with U.S. Appl. No. 18/308,087, filed Apr. 27, 2023, 25 pages.
Final Office Action mailed on Jun. 10, 2025, issued in connection with U.S. Appl. No. 18/308,065, filed Apr. 27, 2023, 18 pages.
Final Office Action mailed on Nov. 13, 2024, issued in connection with U.S. Appl. No. 18/487,290, filed Oct. 16, 2023, 13 pages.
Final Office Action mailed on Mar. 14, 2025, issued in connection with U.S. Appl. No. 18/440,111, filed Feb. 13, 2024, 30 pages.
Final Office Action mailed on Mar. 17, 2025, issued in connection with U.S. Appl. No. 18/356,477, filed Jul. 21, 2023, 25 pages.
Final Office Action mailed on Jul. 18, 2024, issued in connection with U.S. Appl. No. 17/450,925, filed Oct. 14, 2021, 11 pages.
Final Office Action mailed on Aug. 2, 2024, issued in connection with U.S. Appl. No. 18/048,034, filed Oct. 20, 2022, 7 pages.
Final Office Action mailed on Jul. 2, 2024, issued in connection with U.S. Appl. No. 18/308,065, filed Apr. 27, 2023, 17 pages.
Final Office Action mailed on May 20, 2024, issued in connection with U.S. Appl. No. 18/308,087, filed Apr. 27, 2023, 29 pages.
Final Office Action mailed on Sep. 20, 2023, issued in connection with U.S. Appl. No. 17/810,549, filed Jul. 1, 2022, 18 pages.
Final Office Action mailed on Oct. 22, 2024, issued in connection with U.S. Appl. No. 17/458,673, filed Aug. 27, 2021, 27 pages.
Final Office Action mailed on Jan. 3, 2024, issued in connection with U.S. Appl. No. 17/807,270, filed Jun. 16, 2022, 22 pages.
Final Office Action mailed on Oct. 30, 2023, issued in connection with U.S. Appl. No. 17/458,673, filed Aug. 27, 2021, 20 pages.
Final Office Action mailed on Jul. 8, 2024, issued in connection with U.S. Appl. No. 17/222,950, filed Apr. 5, 2021, 10 pages.
Final Office Action mailed on May 8, 2024, issued in connection with U.S. Appl. No. 18/189,863, filed Mar. 24, 2023, 28 pages.
*Google LLC* v. *Sonos, Inc*., Judgment. Final Written Decision Determining All Challenged Claims Unpatentable for IPR of U.S. Pat. No. 9,219,460, IPR2021-00475, Feb. 15, 2023, 45 pages.
International Bureau, International Preliminary Report on Patentability, mailed on Apr. 11, 2024, issued in connection with International Application No. PCT/US2022/077107, filed on Sep. 27, 2022, 9 pages.
International Bureau, International Preliminary Report on Patentability, mailed on Aug. 22, 2024, issued in connection with International Application No. PCT/US2023/062179, filed on Feb. 8, 2023, 8 pages.
International Bureau, International Preliminary Report on Patentability, mailed on Apr. 4, 2024, issued in connection with International Application No. PCT/US2022/076972, filed on Sep. 23, 2022, 14 pages.
International Bureau, International Search Report and Written Opinion mailed on Mar. 23, 2023, issued in connection with International Application No. PCT/US2022/076972, filed on Sep. 23, 2022, 20 pages.
Japanese Patent Office, Decision to Grant a Patent and Translation mailed on Dec. 10, 2024, issued in connection with Japanese Patent Application No. 2022-115789, 5 pages.
Japanese Patent Office, English Translation of Office Action mailed on Apr. 2, 2024, issued in connection with Japanese Application No. 2022-115789, 6 pages.
Japanese Patent Office, Notice of Reasons for Refusal and Translation mailed on Jul. 1, 2025, issued in connection with Japanese Patent Application No. 2023-164165, 10 pages.
Japanese Patent Office, Notice of Reasons for Refusal and Translation mailed on Dec. 10, 2024, issued in connection with Japanese Patent Application No. 2023-149069, 8 pages.
Japanese Patent Office, Notice of Reasons for Refusal and Translation mailed on Dec. 17, 2024, issued in connection with Japanese Patent Application No. 2023-164165, 9 pages.
Japanese Patent Office, Notice of Reasons for Refusal and Translation mailed on Dec. 3, 2024, issued in connection with Japanese Patent Application No. 2023-144379, 12 pages.
Japanese Patent Office, Notice of Reasons for Refusal and Translation mailed on Dec. 3, 2024, issued in connection with Japanese Patent Application No. 2023-144387, 8 pages.
Japanese Patent Office, Office Action and Translation mailed on Jul. 11, 2024, issued in connection with Japanese Application No. 2022-115789, 10 pages.

(56) References Cited

OTHER PUBLICATIONS

Japanese Patent Office, Office Action and Translation mailed on Sep. 5, 2023, issued in connection with Japanese Application No. 2022-115789, 6 pages.
Japanese Patent Office, Office Action and Translation mailed on Mar. 7, 2023, issued in connection with Japanese Application No. 2022-001030, 11 pages.
Japanese Patent Office, Office Action and Translation mailed on Oct. 8, 2024, issued in connection with Japanese Patent Application No. 2023-118922, 9 pages.
Korean Patent Office, Korean Examination Report and Translation mailed on Jul. 17, 2024, issued in connection with Korean Application No. 10-2022-7024007, 10 pages.
Korean Patent Office, Korean Examination Report and Translation mailed on Aug. 5, 2024, issued in connection with Korean Application No. 10-2023-7031855, 10 pages.
Korean Patent Office, Korean Examination Report and Translation mailed on Nov. 6, 2024, issued in connection with Korean Application No. 10-2023-7032988, 13 pages.
Korean Patent Office, Korean Office Action and Translation mailed on Oct. 20, 2024, issued in connection with Korean Application No. 10-2023-7036702, 22 pages.
Non-Final Office Action mailed on Mar. 3, 2025, issued in connection with U.S. Appl. No. 18/308,087, filed Apr. 27, 2023, 25 pages.
Non-Final Office Action mailed on Sep. 10, 2025, issued in connection with U.S. Appl. No. 18/356,477, filed Jul. 21, 2023, 20 pages.
Non-Final Office Action mailed on Jul. 11, 2024, issued in connection with U.S. Appl. No. 18/313,013, filed May 5, 2023, 18 pages.
Non-Final Office Action mailed on May 11, 2023, issued in connection with U.S. Appl. No. 17/458,673, filed Aug. 27, 2021, 18 pages.
Non-Final Office Action mailed on Feb. 12, 2025, issued in connection with U.S. Appl. No. 18/189,863, filed Mar. 24, 2023, 28 pages.
Non-Final Office Action mailed on Aug. 15, 2024, issued in connection with U.S. Appl. No. 18/323,039, filed May 24, 2023, 09 pages.
Non-Final Office Action mailed on Aug. 15, 2024, issued in connection with U.S. Appl. No. 18/487,290, filed Oct. 16, 2023, 13 pages.
Non-Final Office Action mailed on Dec. 15, 2022, issued in connection with U.S. Appl. No. 17/807,595, filed Jun. 17, 2022, 16 pages.
Non-Final Office Action mailed on May 15, 2023, issued in connection with U.S. Appl. No. 17/567,311, filed Jan. 3, 2022, 12 pages.
Non-Final Office Action mailed on Oct. 16, 2025, issued in connection with U.S. Appl. No. 18/440,111, filed Feb. 13, 2024, 28 pages.
Non-Final Office Action mailed on Jan. 17, 2023, issued in connection with U.S. Appl. No. 17/407,793, filed Aug. 20, 2021, 9 pages.
Non-Final Office Action mailed on Oct. 17, 2025, issued in connection with U.S. Appl. No. 18/502,349, filed Nov. 6, 2023, 09 pages.
Non-Final Office Action mailed on Sep. 17, 2024, issued in connection with U.S. Appl. No. 18/449,388, filed Aug. 14, 2023, 22 pages.
Non-Final Office Action mailed on Feb. 18, 2025, issued in connection with U.S. Appl. No. 18/600,044, filed Mar. 8, 2024, 28 pages.
Non-Final Office Action mailed on Apr. 19, 2023, issued in connection with U.S. Appl. No. 17/807,270, filed Jun. 16, 2022, 19 pages.
Non-Final Office Action mailed on Jan. 19, 2024, issued in connection with U.S. Appl. No. 18/308,087, filed Apr. 27, 2023, 22 pages.
Non-Final Office Action mailed on Jul. 19, 2023, issued in connection with U.S. Appl. No. 18/066,077, filed Dec. 14, 2022, 36 pages.
Non-Final Office Action mailed on Feb. 2, 2024, issued in connection with U.S. Appl. No. 18/297,214, filed Apr. 7, 2023, 13 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on Mar. 20, 2025, issued in connection with U.S. Appl. No. 19/028,592, filed Jan. 17, 2025, 33 pages.
Non-Final Office Action mailed on May 20, 2024, issued in connection with U.S. Appl. No. 18/600,044, filed Mar. 8, 2024, 24 pages.
Non-Final Office Action mailed on Mar. 21, 2025, issued in connection with U.S. Appl. No. 19/029,744, filed Jan. 17, 2025, 26 pages.
Non-Final Office Action mailed on Sep. 21, 2023, issued in connection with U.S. Appl. No. 18/352,394, filed Jul. 14, 2023, 6 pages.
Non-Final Office Action mailed on Nov. 22, 2024, issued in connection with U.S. Appl. No. 18/308,065, filed Apr. 27, 2023, 15 pages.
Non-Final Office Action mailed on Jun. 23, 2023, issued in connection with U.S. Appl. No. 18/189,869, filed Mar. 24, 2023, 13 pages.
Non-Final Office Action mailed on Jan. 24, 2024, issued in connection with U.S. Appl. No. 18/189,863, filed Mar. 24, 2023, 28 pages.
Non-Final Office Action mailed on May 24, 2023, issued in connection with U.S. Appl. No. 18/175,283, filed Feb. 27, 2023, 13 pages.
Non-Final Office Action mailed on Jan. 25, 2023, issued in connection with U.S. Appl. No. 17/816,238, filed Jul. 29, 2022, 10 pages.
Non-Final Office Action mailed on Oct. 25, 2023, issued in connection with U.S. Appl. No. 18/308,065, filed Apr. 27, 2023, 15 pages.
Non-Final Office Action mailed on Feb. 26, 2025, issued in connection with U.S. Appl. No. 18/657,019, filed May 7, 2024, 27 pages.
Non-Final Office Action mailed on Jun. 26, 2023, issued in connection with U.S. Appl. No. 17/543,014, filed Dec. 6, 2021, 17 pages.
Non-Final Office Action mailed on Nov. 26, 2024, issued in connection with U.S. Appl. No. 18/424,041, filed Jan. 26, 2024, 07 pages.
Non-Final Office Action mailed on Feb. 27, 2024, issued in connection with U.S. Appl. No. 18/343,487, filed Jun. 28, 2023, 42 pages.
Non-Final Office Action mailed on Feb. 27, 2025, issued in connection with U.S. Appl. No. 18/487,290, filed Oct. 16, 2023, 14 pages.
Non-Final Office Action mailed on Aug. 28, 2025, issued in connection with U.S. Appl. No. 18/463,762, filed Sep. 8, 2023, 14 pages.
Non-Final Office Action mailed on Sep. 29, 2024, issued in connection with U.S. Appl. No. 18/356,477, filed Jul. 21, 2023, 26 pages.
Non-Final Office Action mailed on Sep. 29, 2024, issued in connection with U.S. Appl. No. 18/440,111, filed Feb. 13, 2024, 25 pages.
Non-Final Office Action mailed on Jul. 30, 2024, issued in connection with U.S. Appl. No. 17/994,577, filed Nov. 28, 2022, 13 pages.
Non-Final Office Action mailed on May 31, 2023, issued in connection with U.S. Appl. No. 17/810,549, filed Jul. 1, 2022, 19 pages.
Non-Final Office Action mailed on Aug. 6, 2024, issued in connection with U.S. Appl. No. 18/313,859, filed May 8, 2023, 20 pages.
Non-Final Office Action mailed on Aug. 7, 2023, issued in connection with U.S. Appl. No. 17/807,270, filed Jun. 16, 2022, 20 pages.
Non-Final Office Action mailed on Aug. 7, 2024, issued in connection with U.S. Appl. No. 18/502,644, filed Nov. 6, 2023, 31 pages.
Non-Final Office Action mailed on Mar. 7, 2024, issued in connection with U.S. Appl. No. 17/458,673, filed Aug. 27, 2021, 26 pages.

(56) References Cited

OTHER PUBLICATIONS

Non-Final Office Action mailed on Mar. 7, 2024, issued in connection with U.S. Appl. No. 18/338,841, filed Jun. 21, 2023, 15 pages.
Non-Final Office Action mailed on Aug. 8, 2024, issued in connection with U.S. Appl. No. 18/463,827, filed Sep. 8, 2023, 7 pages.
Non-Final Office Action mailed on Jul. 8, 2024, issued in connection with U.S. Appl. No. 18/520,531, filed Nov. 27, 2023, 63 pages.
Notice of Allowance mailed on Aug. 1, 2025, issued in connection with U.S. Appl. No. 18/487,290, filed Oct. 16, 2023, 07 pages.
Notice of Allowance mailed on Dec. 5, 2024, issued in connection with U.S. Appl. No. 18/463,827, filed Sep. 8, 2023, 9 pages.
Notice of Allowance mailed on Aug. 7, 2024, issued in connection with U.S. Appl. No. 18/338,841, filed Jun. 21, 2023, 05 pages.
Notice of Allowance mailed on Jul. 1, 2024, issued in connection with U.S. Appl. No. 18/511,775, filed Nov. 16, 2023, 11 pages.
Notice of Allowance mailed on Jan. 10, 2024, issued in connection with U.S. Appl. No. 18/069,042, filed Dec. 20, 2022, 18 pages.
Notice of Allowance mailed on Jul. 10, 2024, issued in connection with U.S. Appl. No. 18/309,939, filed May 1, 2023, 5 pages.
Notice of Allowance mailed on May 11, 2023, issued in connection with U.S. Appl. No. 17/804,372, filed May 27, 2022, 8 pages.
Notice of Allowance mailed on Oct. 11, 2024, issued in connection with U.S. Appl. No. 18/351,033, filed Jul. 12, 2023, 09 pages.
Notice of Allowance mailed on Apr. 12, 2024, issued in connection with U.S. Appl. No. 18/358,710, filed Jul. 25, 2023, 9 pages.
Notice of Allowance mailed on Jun. 12, 2024, issued in connection with U.S. Appl. No. 17/807,270, filed Jun. 16, 2022, 10 pages.
Notice of Allowance mailed on Sep. 12, 2024, issued in connection with U.S. Appl. No. 18/432,265, filed Feb. 5, 2024, 8 pages.
Notice of Allowance mailed on Apr. 13, 2023, issued in connection with U.S. Appl. No. 18/058,639, filed Nov. 23, 2022, 15 pages.
Notice of Allowance mailed on Feb. 13, 2023, issued in connection with U.S. Appl. No. 17/543,430, filed Dec. 6, 2021, 10 pages.
Notice of Allowance mailed on Sep. 13, 2023, issued in connection with U.S. Appl. No. 17/543,014, filed Dec. 6, 2021, 9 pages.
Notice of Allowance mailed on Jun. 14, 2023, issued in connection with U.S. Appl. No. 17/816,238, filed Jul. 29, 2022, 11 pages.
Notice of Allowance mailed on Nov. 14, 2024, issued in connection with U.S. Appl. No. 18/343,487, filed Jun. 28, 2023, 12 pages.
Notice of Allowance mailed on Aug. 15, 2025, issued in connection with U.S. Appl. No. 18/600,044, filed Mar. 8, 2024, 07 pages.
Notice of Allowance mailed on Jan. 15, 2025, issued in connection with U.S. Appl. No. 18/449,388, filed Aug. 14, 2023, 8 pages.
Notice of Allowance mailed on Jan. 16, 2024, issued in connection with U.S. Appl. No. 17/810,549, filed Jul. 1, 2022, 7 pages.
Notice of Allowance mailed on Jul. 17, 2024, issued in connection with U.S. Appl. No. 18/310,025, filed May 1, 2023, 7 pages.
Notice of Allowance mailed on Jan. 18, 2024, issued in connection with U.S. Appl. No. 18/352,394, filed Jul. 14, 2023, 7 pages.
Notice of Allowance mailed on Jun. 18, 2024, issued in connection with U.S. Appl. No. 18/297,214, filed Apr. 7, 2023, 10 pages.
Notice of Allowance mailed on Apr. 19, 2023, issued in connection with U.S. Appl. No. 17/113,799, filed Dec. 7, 2020, 7 pages.
Notice of Allowance mailed on Aug. 19, 2024, issued in connection with U.S. Appl. No. 18/345,588, filed Jun. 30, 2023, 20 pages.
Notice of Allowance mailed on Jul. 19, 2024, issued in connection with U.S. Appl. No. 18/328,932, filed Jun. 5, 2023, 9 pages.
Notice of Allowance mailed on Oct. 2, 2023, issued in connection with U.S. Appl. No. 18/189,869, filed Mar. 24, 2023, 8 pages.
Notice of Allowance mailed on Jun. 20, 2025, issued in connection with U.S. Appl. No. 18/424,041, filed Jan. 26, 2024, 8 pages.
Notice of Allowance mailed on Oct. 20, 2025, issued in connection with U.S. Appl. No. 18/308,065, filed Apr. 27, 2023, 08 pages.
Notice of Allowance mailed on Nov. 21, 2024, issued in connection with U.S. Appl. No. 18/323,039, filed May 24, 2023, 07 pages.
Notice of Allowance mailed on Sep. 21, 2023, issued in connection with U.S. Appl. No. 17/567,311, filed Jan. 3, 2022, 8 pages.

* cited by examiner

| Representative Spectral Characteristic | Playback Device Characteristic (Model) | Audio Processing Algorithm |
| --- | --- | --- |
| $h_{room}^{-1}(t)$-1 | PLAY: 3 | $w_1$, $x_1$, $y_1$, and $z_1$ |
| $h_{room}^{-1}(t)$-2 | PLAY: 3 | $w_2$, $x_2$, $y_2$, and $z_2$ |
| $h_{room}^{-1}(t)$-3 | PLAY: 3 | $w_3$, $x_3$, $y_3$, and $z_3$ |
| $h_{room}^{-1}(t)$-4 | PLAY: 3 | $w_4$, $x_4$, $y_4$, and $z_4$ |
| . . . . . . | . . . . . . | . . . . . . |

801a 801b 801c 801d 802a 802b 802c 802d 803a 803b 803c 803d

PLAYBACK DEVICE CALIBRATION BASED ON REPRESENTATIVE SPECTRAL CHARACTERISTICS

CROSS REFERENCE TO RELATED APPLICATIONS

The present application is a continuation of U.S. patent application Ser. No. 17/810,549, filed Jul. 1, 2024, now U.S. Pat. No. 11,995,376, which is a continuation of U.S. patent application Ser. No. 17/135,308, filed Dec. 28, 2020, now U.S. Pat. No. 11,379,179, which is a continuation of U.S. patent application Ser. No. 16/555,832, filed Aug. 29, 2019, now U.S. Pat. No. 10,884,698, which is a continuation of U.S. patent application Ser. No. 15/865,221, filed Jan. 8, 2018, now U.S. Pat. No. 10,402,154, which is a continuation of U.S. patent application Ser. No. 15/089,004, filed Apr. 1, 2016, now U.S. Pat. No. 9,864,574, which are incorporated herein by reference in their entireties.

The present application incorporates by reference U.S. patent application Ser. No. 14/481,505, filed on Sep. 9, 2014, for "Audio Processing Algorithms;" U.S. patent application Ser. No. 14/481,511, filed on Sep. 9, 2014, for "Playback Device Calibration;" and U.S. patent application Ser. No. 14/805,140, filed on Jul. 21, 2015, for "Hybrid Test Tone for Space-Averaged Room Audio Calibration Using a Moving Microphone." The present application also incorporates by reference U.S. patent application Ser. No. 15/088,994, filed on Apr. 1, 2016, for "Updating Playback Device Configuration Information Based on Calibration Data."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
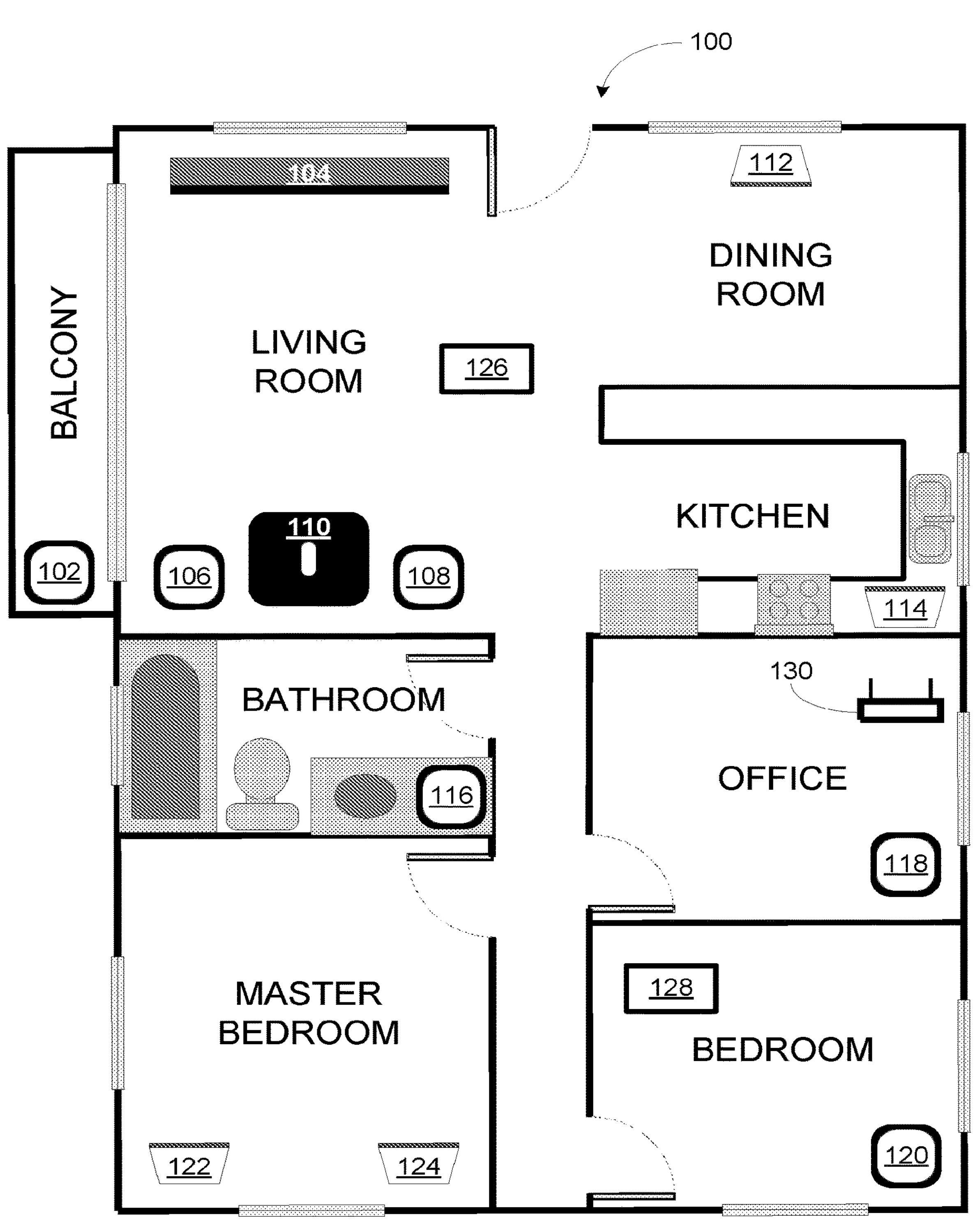
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples described herein involve calibrating a playback device within a playback environment based on representative spectral characteristics. Utilizing representative spectral characteristics may facilitate a playback device calibration process that is, as one example, shorter in duration. Other benefits are also possible.

For instance, calibration data may be aggregated by a computing device, such as a server, from the individual calibrations of numerous different playback devices located in numerous different playback environments. From each calibration, a spectral characteristic may be determined corresponding to the audio response of the given playback environment. Each spectral characteristic may represent, for example, the size, shape, furnishing, etc. of the given playback environment (e.g., room) where each playback devices was calibrated. The computing device may gather data relating to playback device characteristics from each calibration as well, such as the device model, hardware and/or software versions, zone configurations, and other manual settings corresponding to each individual playback device that is calibrated.

From the aggregated calibration data, the determined spectral characteristics may be grouped, mathematically and/or otherwise, into a substantially smaller number of representative spectral characteristics that may capture the entire data set within a reasonable margin of error. For instance, thousands or perhaps even millions of individual calibrations from households and playback environments around the world may yield a similar number of spectral characteristics. In some cases, there may be substantial commonality and/or overlap in the distribution of spectral characteristics across all calibrated playback devices and playback environments.

Accordingly, the computing device may analyze the calibration data and determine, for instance, 50 representative spectral characteristics that may represent, within a reasonable margin of error, the scope of potential playback environments in which a playback device may be calibrated. The representative spectral characteristics may be maintained in a database on the computing device, and may be used to simplify additional calibrations that may be performed.

For example, some of the calibrations discussed above that are used as a basis for determining the representative spectral characteristics may involve recording, via a microphone, the playback of audio data from the playback device to be calibrated. The recorded audio data may need to be of a minimum duration, such as 45 seconds, and may need to include a minimum range of frequencies, in order for the computing device to have enough spectral data to determine the spectral characteristic corresponding to the playback environment being calibrated. In some cases, the calibration process may require the microphone to be moved between different spatial locations within the playback environment while the calibration audio is recorded.

Alternatively, the representative spectral characteristics discussed above may be used by the computing device to approximate, with reasonable accuracy, the audio response of the playback environment in question. This may reduce the amount of spectral data that is required, and may therefore simplify the calibration procedure in one or more ways. For example, the computing device may receive spectral data corresponding to only 10 seconds of recorded audio playback. Nonetheless, based on this sample, the computing device may identify one of the representative spectral characteristics that substantially matches the received spectral data. In this way, the duration of audio playback portion the calibration procedure may be shortened.

The requirement for less spatial data to perform a calibration of a given playback device may result in other simplifications as well. For instance, it may allow the microphone to record audio data other than a calibration tone, which may have pre-determined frequency sweeps. Instead, the calibration may be based on the recorded playback of media content having a narrower spectral range. In this way, a calibration might occur during the normal course of enjoying audio playback by the playback device. As another example, the calibration procedure may require less, or perhaps no movement of the microphone throughout the playback environment while the calibration audio is recorded. Other possibilities also exist.

Once the computing device has identified a representative spectral characteristic in the database, it may identify an audio processing algorithm in the database based on the identified representative spectral characteristic and at least one playback device characteristic. For instance, the database may include an entry for an audio processing algorithm that corresponds to the identified representative spectral characteristic in conjunction with a particular model of playback device. Other playback device characteristics may also be used.

The computing device may transmit the identified audio processing algorithm to the playback device. The playback device may then apply the audio processing algorithm, resulting in the playback of audio content that is calibrated to the particular audio characteristics of its playback environment.

In some cases, the use of representative spectral characteristics may facilitate a playback device performing a self-calibration within a playback environment, according to some of the examples discussed above. For example, the playback device may include a microphone, which may be used to record the playback device's own playback of audio data. The playback device may then transmit the recorded audio playback data to the computing device.

Because the microphone in this example is stationary, the recorded audio playback data may include less spectral data then might otherwise be required to accurately determine the audio response of the playback environment "from scratch." However, as discussed above, the computing device may identify a representative spectral characteristic from the database that substantially matches the spectral data that is received.

The playback device may then receive, from the computing device, data indicating an audio processing algorithm corresponding to the playback environment. The playback device may then apply the audio processing algorithm while playing back further audio content, resulting in audio playback that is calibrated to the playback environment.

As indicated above, the examples involve calibrating a playback device based on representative spectral characteristic data. In one aspect, a method is provided. The method involves maintaining, by a computing device, a database of representative spectral characteristics and receiving, by the computing device, particular spectral data associated with a particular playback environment corresponding to the particular playback device. The method also involves, based on the particular spectral data, identifying one of the representative spectral characteristics from the database that substantially matches the particular spectral data and identifying, in the database, an audio processing algorithm based on a) the identified representative spectral characteristic and b) at least one characteristic of the particular playback device. Further, the method also involves transmitting, to the particular playback device, data indicating the identified audio processing algorithm.

In another aspect, a computing device is provided. The device includes a processor, a non-transitory computer readable medium, and program instructions stored on the non-transitory computer readable medium that, when executed by the processor, cause the computing device to perform functions. The functions include maintaining a database of representative spectral characteristics and receiving particular spectral data associated with a particular playback environment corresponding to a particular playback device. The functions also include, based on the particular spectral data, identifying one of the representative spectral characteristics from the database that substantially matches the particular spectral data and identifying, in the database, an audio processing algorithm based on a) the identified representative spectral characteristic and b) at least one characteristic of the particular playback device. Further, the functions include transmitting, to the particular playback device, data indicating the identified audio processing algorithm.

In yet another aspect, a playback device is provided. The device includes a processor, a microphone, a non-transitory computer readable medium, and program instructions stored on the non-transitory computer readable medium that, when executed by the processor, cause the playback device to perform functions. The functions include playing back first audio content in a playback environment and recording, via the microphone, at least a portion of the played back first audio content. The functions also include transmitting the recorded audio content to a computing device and receiving, from the computing device, data indicating an audio processing algorithm corresponding to the playback environment. Further, the functions include applying the audio processing algorithm while playing back second audio content in the playback environment.

It will be understood by one of ordinary skill in the art that this disclosure includes numerous other embodiments. It will be understood by one of ordinary skill in the art that this disclosure includes numerous other examples. While some examples described herein may refer to functions performed by given actors such as "users" and/or other entities, it should be understood that this description is for purposes of explanation only. The claims should not be interpreted to require action by any such example actor unless explicitly required by the language of the claims themselves.

While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
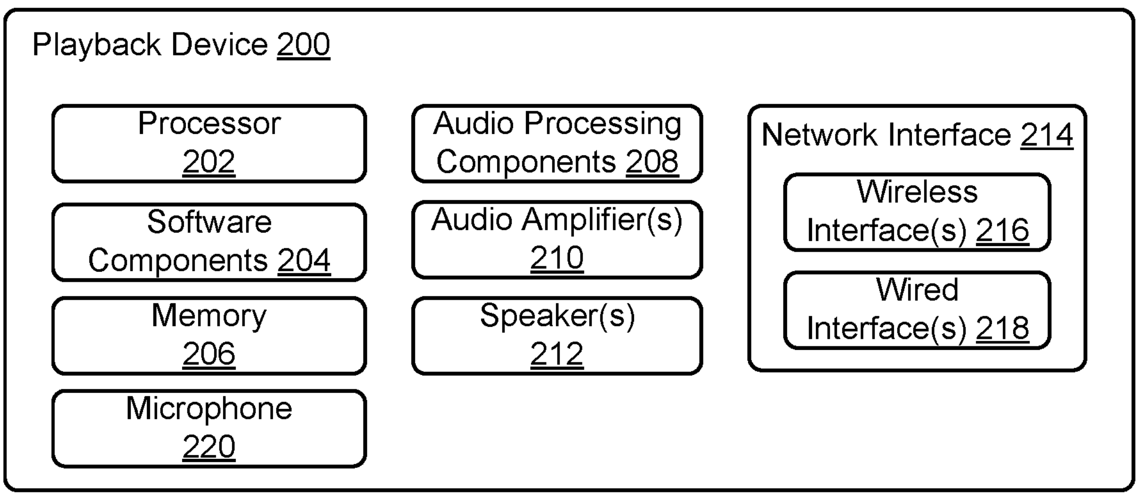
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The playback device 200 may also include one or more microphones 220. The microphone(s) 220 may be used to detect audio data in proximity to the playback device 200, such as voice commands for controlling the playback device 200. Further, the microphone(s) 220 may be used to capture and record audio playback data from the playback device 200, or from one or more other playback devices in proximity to the playback device 200, during a calibration procedure. Other examples and other uses for the microphone(s) 220 are also possible.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
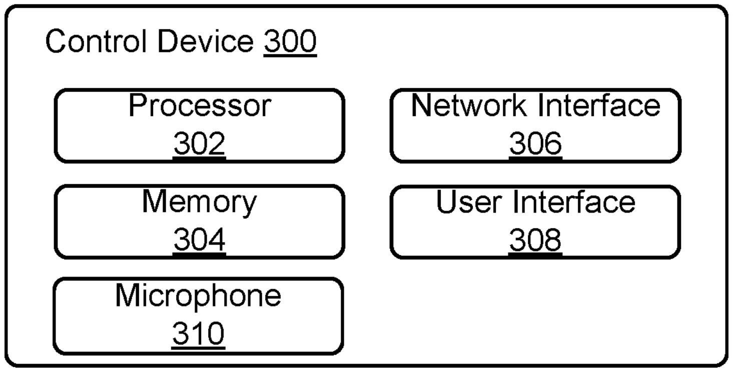
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

The control device 300 may also include one or more microphones 310. The microphone(s) 310 may be used to detect audio data in proximity to the control device 300, such as voice commands for controlling the control device 300. Further, the microphone(s) 310 may be used to capture and record audio playback data from a playback device, such as the playback device 200 shown in FIG. 2, during a calibration procedure of a playback device 200. Other examples and other uses for the microphone(s) 310 are also possible.

Figure 4:
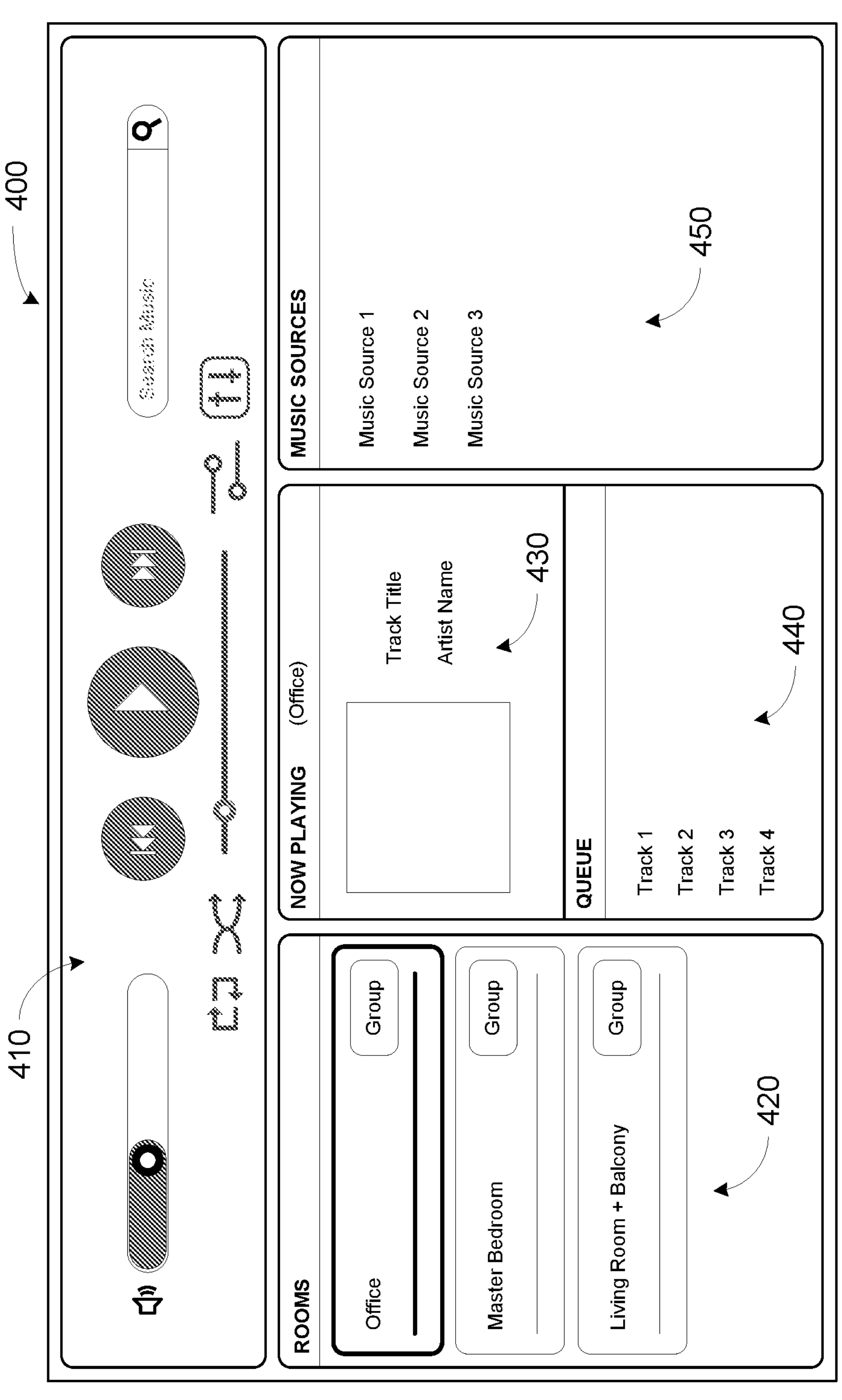
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Playback Device Calibration

As further discussed in the related applications Ser. No. 14/481,505, Ser. No. 14/481,511, and Ser. No. 14/805,140, which are incorporated herein by reference, an example calibration of a playback device in a playback environment may generally involve the playback device playing back a first audio signal, which is detected and recorded by a microphone as a second audio signal. For instance, the playback device may be the playback device 200 shown in FIG. 2, and the microphone 310 may be part of a control device 300, such as a smartphone. In other examples, the microphone may be the microphone 220 of the playback device 200, or of another playback device, among other possibilities.

The first audio signal may be a test or calibration tone having a particular spectral profile. Different test tones may be stored and used based on the particular configuration of the playback device 200, an anticipated genre of music to be played, the particular characteristics of the playback environment (e.g., room size), etc. After detecting the second audio signal, the control device 300 may, in some examples, send data indicating the second audio signal to a computing device. The computing device may be a server that determines, based on the data indicating the second audio signal, an audio processing algorithm for use by the playback device 200 in the playback environment, which may be transmitted back to the playback device 200.

The audio processing algorithm determined for the playback device 200 in a given calibration is based on several inputs. First, each calibration of the playback device 200 may generally aim to calibrate the playback device 200 according to a target frequency response curve. The target frequency response curve may correspond to a frequency response that is considered good-sounding, or pleasing to a typical listener. The target frequency response curve may vary based on the model of playback device 200 (e.g., size), the orientation of the playback device 200 (e.g., vertical or horizontal), or other configurations states of the playback device 200 (e.g., bonded with another playback device). The computing device may store target frequency response curves in a database for each potential configuration, or they may be stored on the playback device 200, the controller device 300, or more than one of the above.

Further, the microphone that detects the first audio signal, whether it is the microphone 310 on the control device, the microphone 220 on the playback device 200, or a microphone on another playback device, has its own audio characteristics. For example, the response of microphone 310 may depend on the type and model of control device 300 used. The microphone response curve may also be stored in the database on the computing device, or elsewhere. With this information, the second audio signal that is detected by the microphone 310 may be normalized considering the known audio characteristics of the microphone 310. Other known adjustments to the second audio signal may also be applied. For instance, in some cases, the control device 300 may be configured to detect the presence of a protective case, and may obtain from the computing device information regarding the effects of the case on the microphone's audio characteristics. Again, this information may be stored in the database on the computing device. Other possibilities also exist.

Additionally, the second audio signal detected by the microphone 310 will reflect a frequency response corresponding to the playback environment where the playback device is located. Unlike the configuration of the playback device 200, the target frequency response curve, microphone response curve, and other device-based inputs, which may be generally known, the frequency response of the playback environment may represent an unknown variable in each calibration. For instance, the frequency response of the playback environment may be based on the size of a given room, its construction materials, the furnishings of the room and their location with in the room, among other factors. Consequently, it may be determined empirically during the calibration using the microphone 310.

Based on at least some of the calibration inputs discussed above, the computing device may determine an audio processing algorithm that, when transmitted to and applied by the playback device 200 in the playback environment, will cause audio playback by the playback device 200 to approach or meet the target frequency response curve. More or fewer calibration inputs than those described above may be used. However, to obtain a playback device calibration that is specific to the playback environment, some calibration procedures may require a minimum amount of recorded spectral data from the playback environment for the computing device to determine an accurate response curve for the playback environment. For instance, some calibrations may require 45 seconds of recorded playback of the test tone, which may proceed through a designated series of spectral sweeps. Further, the calibration may require recorded spectral data from multiple locations in the playback environment, necessitating movement of the microphone about the environment by a user, for instance.

Figure 6:
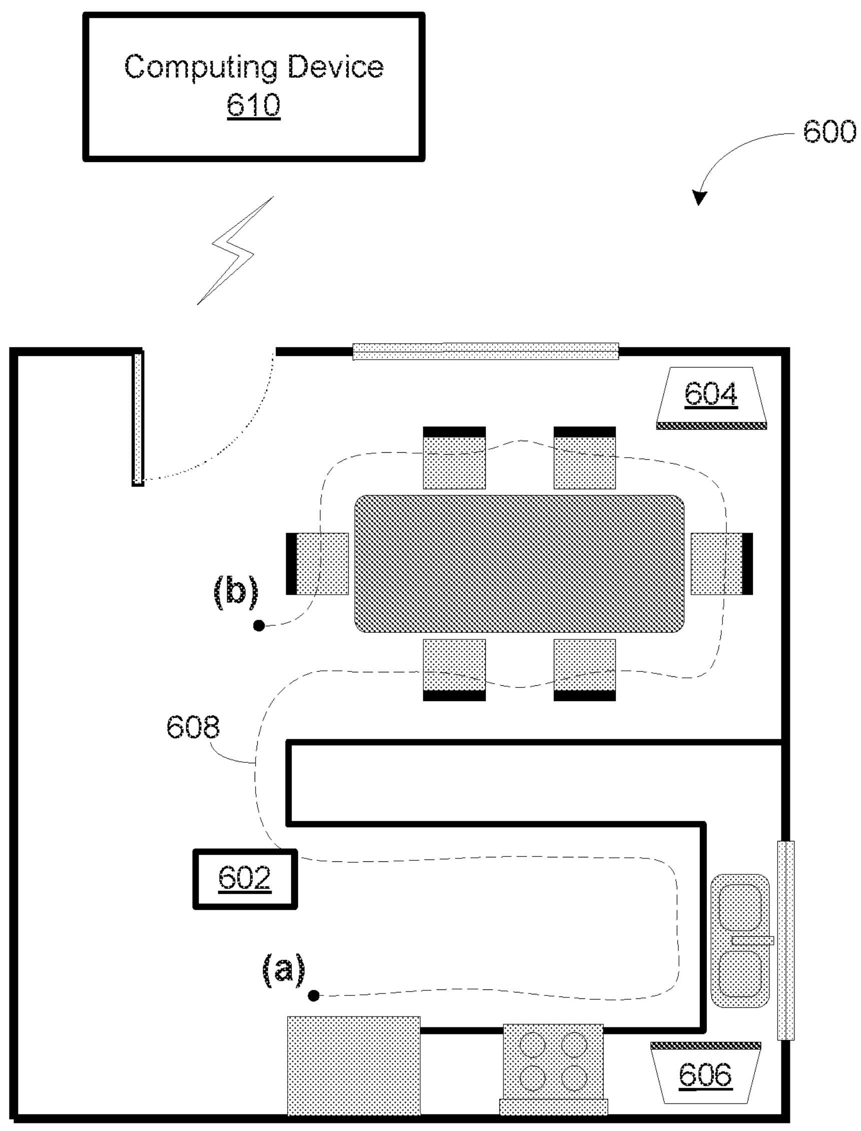
FIG. 6 shows an example playback environment within which a playback device may be calibrated.

FIG. 6 illustrates an example playback environment 600 including a control device 602, a playback device 604, and a playback device 606. The control device 602, which may be coordinating and/or performing at least a portion of the calibration, may be similar to the control device 300 of FIG. 3. The playback devices 604 and 606 may both be similar to the playback device 200 of FIG. 2, and one or both may be calibrated according to the examples discussed herein. FIG. 6 also illustrates an example path 608 from a first location (a) to a second location (b) within the playback environment 600, which may represent the movement of the control device 602 during a calibration.

FIG. 6 also shows a computing device 610, which may collect, store, and transmit the calibration information described herein. The computing device 610 may be a server in communication with a media playback system that includes the playback devices 604 and 606. The computing device 610 may also be in communication, either directly or indirectly, with the control device 602. While the discussions below may refer to the playback environment 600 of FIG. 6, it should be appreciated that the playback environment 600 is only one example of a playback environment within which a playback device may be calibrated. Other examples are also possible.

The computing device 610 may receive and store in the database additional information relating to each calibration event. The information may be transmitted by each of the playback devices that is calibrated, whether in playback environment 600 or elsewhere. Additionally or alternatively, the information may be transmitted by a control device involved in the calibration. For instance, a given playback device and/or control device may transmit information regarding the date and time of a given calibration, an identification of the playback device including the make, model, and serial number, which may further indicate the "age" of the playback device (since it was manufactured), the zone configuration of the playback device, such as a grouping or pairing state, the software version of the playback device, the hardware and software version of a given control device. Numerous other examples are also possible.

In addition, the computing device 610 may receive and store results from each calibration in the database. For example, the computing device may store the determined response curve for each playback environment in which a playback device is calibrated, including more specific information such as the approximate room size or the proximity of an obstructive object to the playback device, which may be detected by the microphone. Further, the computing device 610 may receive and store the audio processing algorithm that is implemented by each playback device as a result of each calibration. For instance, the computing device 610 may receive and store the specific filter coefficients that are applied by each playback device. As another example, the computing device 610 may receive and store a difference metric for each calibration, which may include an indication of how significantly the sound calibration of the playback device changed as a result of the calibration. The computing device 610 may also receive and store information regarding failed calibration attempts, including the reason for the failure, if known. Other examples are also possible.

In some embodiments, the computing device 610 may be a server that is maintained and operated by the company that sells the playback devices being calibrated, such as SONOS, Inc. Alternatively, a third party may maintain and operate the server on behalf of the playback device company. In other examples, a company may employ the methods described herein across multiple different types of speaker systems, which may include playback devices that are made and sold by various different companies. For example, the server might be operated by an audio content provider, or audio content curating service, among other possibilities.

The calibration information discussed above may be provided to the computing device 610 in a variety of ways. For example, the calibration data may be transmitted to the server directly in real time, during or immediately following each calibration that takes place. However, if there are a relatively large number of calibrations across many devices, this may create bandwidth issues at the computing device 610. Therefore, each playback device may locally store and update a calibration file containing the data discussed above. The calibration file may then be periodically requested ("pulled") by the computing device 610, perhaps as part of a playback device diagnostic event or a software update. Alternatively, the calibration file may be transmitted ("pushed") to the computing device 610 by the playback device as part of a diagnostic event or a software update. The calibration file might also be transmitted in response to a manual commend, such as a user input. Other examples are also possible.

In addition to receiving and storing the calibration data, the computing device 610, may also receive and store information from each playback device that is not necessarily related to an individual calibration event. For example, the computing device 610 may receive and store playback device characteristics such as user account(s) data associated with the playback device (e.g., geography, age, gender, etc.), playback history of the playback device and associated data (e.g., listening duration, audio quality, genres, favorites, media sources, etc.) and any manual settings present on the playback device at the time of calibration, such as a manually adjusted equalization (EQ). Other possibilities also exist.

In some embodiments, a calibration check may be performed on a given playback device. For example, each playback device has a target frequency response curve representing how audio content should sound when played in the particular environment by the playback device, once calibrated. Thus, it may be possible to perform a coarse check to determine whether the current calibration of the playback device is within a certain margin of error of the target frequency response curve. For example, the coarse check may include recording audio content from a calibration tone that is simplified in its content, duration, or both. Alternatively, recorded playback of media content may be used for the coarse check. If the current calibration is not within the margin of error, which may be, for example, 10 percent, it may indicate that a calibration should be performed. The user may then be prompted to calibrate the playback device via the interface 308 of the control device 300. In some examples, periodic calibration checks may be performed on a given playback device, such as once per month.

Further, the computing device 610 may receive and store data that may indicate a level of listener satisfaction with each calibration. For instance, if two calibrations for the same device occur in relatively close proximity to each other, with few other variables changing, it may indicate that the listener was dissatisfied with the first calibration. As another example, the computing device may receive an indication that the audio response of the playback device has been manually adjusted following a calibration, which may again indicate that the calibration did not meet the listener's expectations.

On the other hand, the computing device 610 may receive data indicating an increase playback activity following a calibration. This may indicate increased listener satisfaction with the calibration. Further, if the computing device 610 does not receive any recalibration data, nor any data indicating a manual EQ change, it may imply that the user was satisfied. As another example, a simple survey inquiring whether the listener was satisfied with the calibration, or noticed an improvement, may be provided via an interface of the control device 602. Other measures for determining listener satisfaction with a given calibration also exist.

Finally, although the examples described herein may primarily involve the computing device 610 acting as a centralized server receiving and storing calibration information from numerous playback devices across numerous playback environments, it should be understood that the collection, storage, and transmission of calibration information discussed in all of the examples herein may be carried out within a single playback system, by one or more of the playback devices and controllers of the individual system, either temporarily or for an extended period of time. For example, calibration data may be aggregated for all playback device calibrations within a single playback system, and may be stored among one or more of the playback devices or other devices within the playback system. The aggregated calibration data may then be transmitted to another computing device in communication with multiple playback systems. Other examples are also possible.

a. Playback Device Calibration Based on Representative Spectral Characteristics

As noted above, examples discussed herein involve calibrating a playback device within a playback environment based on representative spectral characteristics. Utilizing representative spectral characteristics may facilitate a playback device calibration process that is, for instance, shorter in duration. Other benefits are also possible.

Figure 5:
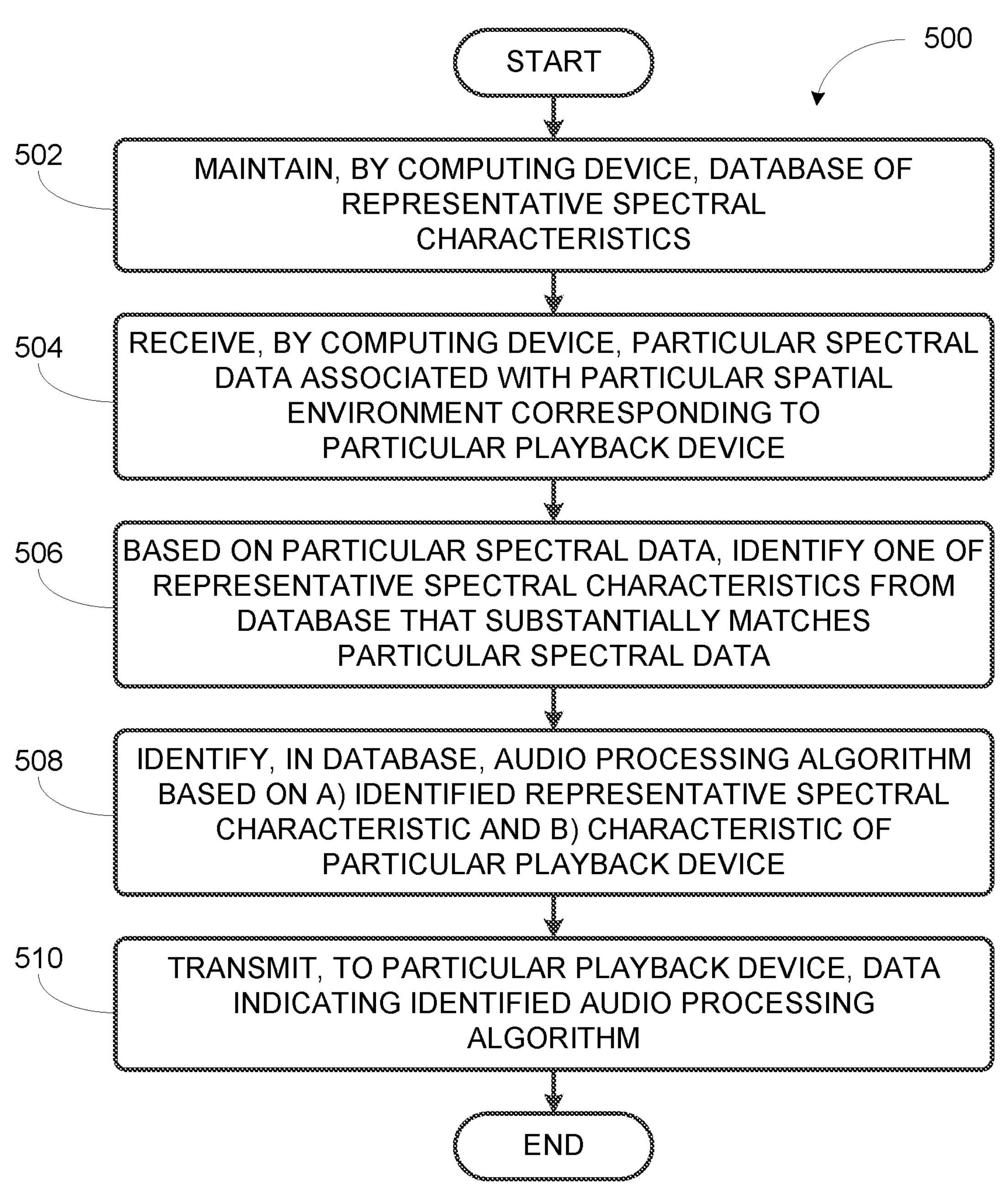
FIG. 5 shows an example flow diagram for calibrating a particular playback device.
Figure 9:
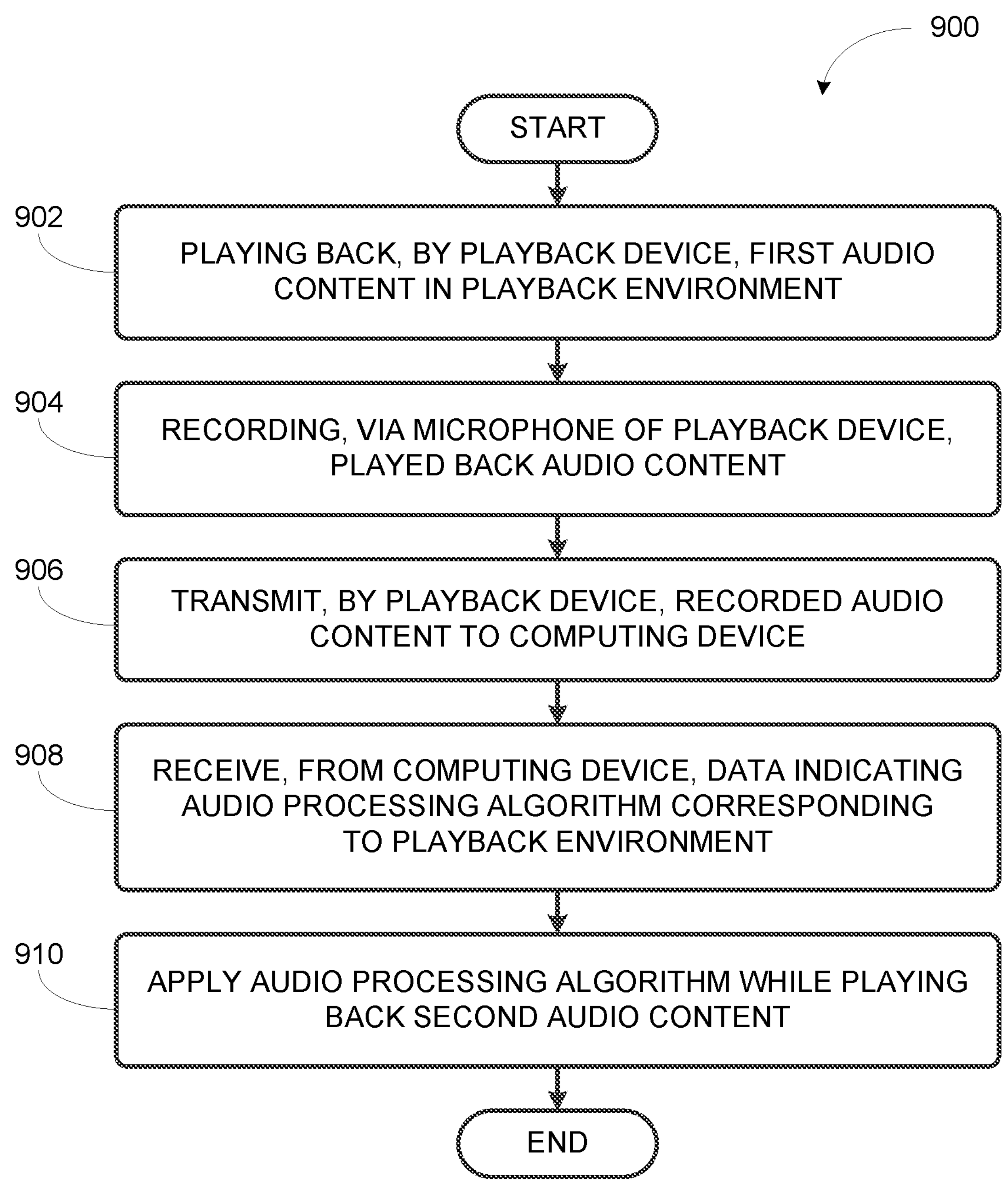
FIG. 9 shows an example flow diagram for calibrating a playback device.

Methods 500 and 900 shown in FIGS. 5 and 9 present embodiments of methods that can be implemented within an operating environment involving, for example, the media playback system 100 of FIG. 1, one or more of the playback device 200 of FIG. 2, and one or more of the control device 300 of FIG. 3. Methods 500 and 900 may include one or more operations, functions, or actions as illustrated by one or more of blocks 502-510 and 902-910. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 500, 900, and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 500, 900 and other processes and methods disclosed herein, each block in FIGS. 5 and 9 may represent circuitry that is wired to perform the specific logical functions in the process.

At block 502 of the method 500, a computing device may maintain a database of representative spectral characteristics. The representative spectral characteristics may be based on a plurality of spectral data corresponding to the plurality of playback environments. For instance, the computing device may be the computing device 610 shown in FIG. 6, which may act as a central server in communication with the plurality of playback devices.

Figure 7:
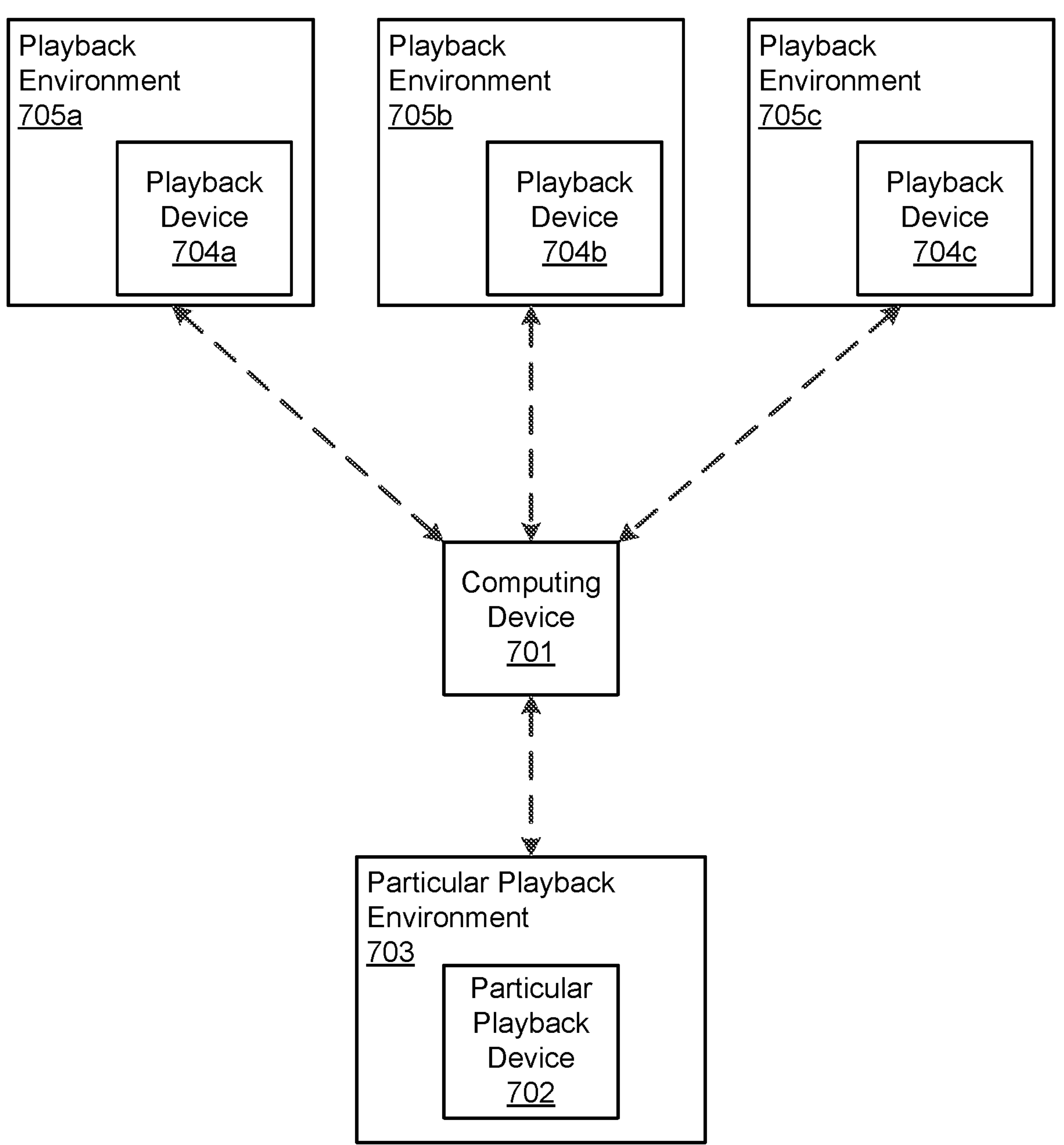
FIG. 7 shows an example computing device in communication with an example plurality of playback devices.

FIG. 7 shows another example of the computing device according to some of the examples discussed herein. In FIG. 7, the computing device is shown as the computing device 701, in communication with a particular playback device 702, which is to be calibrated in a particular playback environment 703. The particular playback device 702 may be similar to the playback device 200 shown in FIG. 2, as well as the playback devices 604 and 606 shown in FIG. 6. FIG. 7 also shows a plurality of playback devices 704*a*, 704*b*, and 704*c*, located respectively within different playback environments 705*a*, 705*b*, and 705*c*. Each of these playback devices may also be similar to the playback device 200 shown in FIG. 2.

The computing device 701 may receive a plurality of spectral data corresponding to the plurality of playback environments 705*a*, 705*b*, and 705*c*. The received spectral data may be the result of individual calibrations of the playback devices 704*a*, 704*b*, and 705*c*, in response to which the computing device 701 may have determined an audio processing algorithm for use by each playback device. In each case, the received spectral data may indicate the response curve for the respective playback environment in which each respective playback device was calibrated. Further, the computing device 701 may store the received spectral data, as well as the determined audio processing algorithm, for each calibration.

The spectral data received from each of the plurality of playback devices 704*a*, 704*b*, and 704*c* may be recorded audio playback data. For instance, a given playback device may play a pre-determined calibration tone during its calibration event. The calibration tone may be recorded by a microphone 310 of an associated control device 300, a microphone 220 of the given playback device, or another microphone, and then transmitted to the computing device 701. Additionally or alternatively, the recorded audio playback data may include recorded audio playback of media content. For example, a microphone as discussed above may, during the normal course of media content playback by the given playback device, record the media content playback and then transmit the recorded audio playback data to the computing device 701. Other examples are also possible.

In some instances, each recorded audio playback data in the plurality of recorded audio playback data may have the same duration. In other words, each calibration event, across all of the playback devices in the plurality of playback devices, may include the playback and recording of audio data having the same duration. The duration may be, for example, 45 seconds, although other durations are also possible.

Moreover, the plurality of playback devices shown in FIG. 7 may represent far more playback devices than the three depicted. In some cases, the computing device 701 may receive spectral data corresponding to hundreds of thousands, perhaps even millions, of playback devices located in different playback environments around the world. Based on spectral data received from this relatively large sample of playback environments, the computing device 701 may determine a finite number of representative spectral characteristics that may simplify the scope of possible results for a given calibration, and thus may simplify the calibration process.

For example, in some cases, the computing device 701 may determine that the response curves for all of the calibrated playback environments may be grouped, mathematically, into a finite number of representative response curves. For instance, the computing device 701 may determine that there are 50 representative response curves that capture all, or nearly all, of the received spectral data within a 5% confidence margin. In some cases, extreme outliers may be ignored. As additional examples, the computing device 701 may determine 12 representative response curves, or perhaps 100. As noted above, this finite number of representative spectral characteristics may be used in some future calibrations. The total number of representative spectral characteristics may depend on a combination of the overall distribution of the received spectral data, the level of accuracy desired, among other factors.

As another example, the representative spectral characteristics may be determined based on other data, as an alternative to or in addition to a strictly mathematical analysis. For instance, the representative spectral characteristics may be determined based, in part, on an indication within the data set that, for a given set of the received spectral data, a similar audio processing algorithm applied by each respective playback device tends to provide a similar level of listener satisfaction with the calibration. Listener satisfaction with a given calibration may be determined or approximated as noted above. Other bases for determining the representative spectral data also exist.

Other characteristics corresponding to each playback device 704*a*, 704*b*, and 705*c* may be collected for each calibration as well, in addition to the received spectral data. For example, each calibration may be associated with a given model number, serial number, and/or software version of the calibrated playback device, or of a control device 300 that may be involved in the calibration. The playback device characteristics may also include manual settings of the playback device at the time of calibration, such as a zone configuration or a manually adjusted EQ. The computing device 701 may also store the results of each calibration as well, including the determined response curve for each playback environment and the determined audio processing algorithm. Other examples are also possible.

These additional playback device characteristics may also inform the determination of the representative spectral characteristics as well. For instance, each playback device that is calibrated may have an audio characteristic that is generally known, based on the model of the playback device. The same may be true for the microphones used in the calibration process, whether in a control device or in the playback device. Based this data, the computing device 701 may normalize the received spectral data from each calibration to be independent of the model of playback device or control device involved in the calibration.

Figure 8:
FIG. 8 shows an example portion of a database of representative spectral characteristics.

FIG. 8 illustrates a portion of an example database 800 maintained by the computing device 701, within which the representative spectral characteristics discussed above may be stored. As shown, the portion of the database 800 may include a plurality of entries 801*a*, 801*b*, 801*c*, and 801*d* each representing one of the determined representative spectral characteristics. The representative spectral characteristics may be stored in the database 800 as mathematical representations $h_{room}^{-1}(t)-1$, $h_{room}^{-1}(t)-2$, $h_{room}^{-1}(t)-3$, and $h_{room}^{-1}(t)-4$, each describing the spectral characteristic of a representative playback environment.

Further, the portion of the database 800 contains a second column containing entries 802*a*, 802*b*, 802*c*, and 802*d*, each representing a playback device characteristic. In the example shown in FIG. 8, the playback device characteristic is a device model, in this case a "PLAY:3" model playback device for each entry. The plurality of entries 802*a*, 802*b*, 802*c*, and 802*d* correspond, respectively, to the entries 801*a*, 801*b*, 801*c*, and 801*d*. Other device models are also possible. Moreover, different playback device characteristics, such as zone configuration, for example, are also possible in the second column of the database 800. In each case, the playback device characteristic used may result in different corresponding entries in further columns of the database 800.

For example, a third column in the portion of the example database 800 contains a series of entries 803*a*, 803*b*, 803*c*, and 803*d*. Each entry in the third column contains coefficients for an audio processing algorithm determined based on the corresponding representative spectral characteristic and the playback device characteristic in the first two columns. For example, the determined representative spectral characteristic 801*a*, in conjunction with the playback device characteristic 802*a*, i.e., a "PLAY: 3" model device, may correspond to an audio processing algorithm 803*a* represented by coefficients $w_1$, $x_1$, $y_1$, and $z_1$, and so on for the additional rows in the database 800.

The portion of the database 800 shown in FIG. 8 represents only one example of a database of representative spectral characteristics that the computing device 701 may populate and maintain. In some instances, more than one playback device characteristic may be used, such as device model and zone configuration, in the determination of the audio processing algorithms. Further, the representative spectral characteristics may be stored in a different format or mathematical state (i.e., inverse vs. non-inverse functions). In another example, the audio processing algorithms may be stored as functions and/or equalization functions. Other examples are also possible.

Whatever its format and content, the database 800 of representative spectral characteristics may be used to simplify a calibration procedure for a particular playback device located in a particular playback environment. Returning to FIG. 6, the particular playback device may be, for instance, the playback device 604, which may be similar to the playback device 200 shown in FIG. 2. Further, the particular playback environment may be the playback environment 600 shown in FIG. 6.

At block 504 of the method 500, the computing device 610 may receive particular spectral data associated with the particular playback environment 600, corresponding to the particular playback device 604. For example, the control device 602 shown in FIG. 6 may initiate a calibration procedure, and the playback device 604 may begin playback of a predetermined calibration tone that is recorded by a microphone of the control device 602. Thus, the particular spectral data may include recorded audio playback data. The particular spectral data may additionally or alternatively include recorded audio playback of media content, as discussed above.

As noted above, a goal of capturing audio playback by a playback device during calibration is to determine the spectral characteristic of the playback environment in question. The calibration of the particular playback device 604 in the present example has, by virtue of the database 800, a finite number of known representative spectral characteristics as a potential result. Consequently, the computing device 610 may be able to identify one of the representative spectral characteristics based on relatively less spectral data than some other calibration procedures, which may involve empirically determining the spectral characteristic of a given playback environment "from scratch."

Accordingly, at block 506, based on the particular spectral data, the computing device 610 may identify one of the representative spectral characteristics from the database 800 that substantially matches the particular spectral data. For instance, the computing device 610 may mathematically determine the best fit for the particular spectral data among the representative spectral characteristics. This may represent a relatively high probability that the particular playback environment 600 corresponds to the identified representative spectral characteristic.

The requirement for less particular spectral data in the calibration of particular playback device 604 may lead to simplification of the calibration process in multiple ways. For instance, as noted above, some calibrations may require 45 seconds of recorded audio playback to determine the spectral characteristic of a given playback environment. However, in the present example, the computing device 610 may require particular spectral data that is shorter in duration. For example, the computing device 610 may be able to identify, with relative accuracy, a representative spectral characteristic that substantially matches the particular playback environment 600 based on only 10 seconds of recorded audio playback from particular playback device 604.

Further, in some cases, the control device 602 might not record the audio playback from the particular playback device consecutively to obtain the necessary spectral data. For instance, rather than recording 10 consecutive seconds, the control device 602 might record brief snippets of audio playback each time the control device 602 is in a different location in the particular playback environment 600, and within a predefined range of the particular playback device 604. These snippets, collectively, may have a relatively short duration, yet they may contain sufficient spectral data for the computing device 610 to identify a representative spectral characteristic.

The particular spectral data may also represent a narrower frequency range than might otherwise be required for to determine a playback environment's audio characteristic. Nonetheless, the computing device 610 may identify, with relative accuracy, one of the representative spectral characteristics in the database 800. The ability of the computing device 610 to identify a representative spectral characteristic based on a narrower frequency range may allow for the reduced duration of recorded audio playback, as noted above. For example, instead of recording a pre-determined calibration tone for its entire duration, which may include an extensive sampling of frequencies, the control device 602 may record, and the computing device 610 may receive, only a first portion of the calibration tone. The first portion of the calibration tone may include a coarse sampling of frequencies that may provide sufficient spectral data for the computing device 610 to make a relatively accurate identification of a representative spectral characteristic. Accordingly, some calibration tones may be arranged in this way, such that the may be used for either a full duration calibration as discussed above, or a shortened calibration as described in the present example.

In addition, the ability of the computing device 610 to identify a representative spectral characteristic based on less frequency data may facilitate the use of media content to calibrate the particular playback device 604, rather than a calibration tone. For example, while some media content may not contain the spectral range of a full-duration calibration tone, it may contain sufficient spectral data to allow the computing device 610 to identify a representative spectral characteristic for the particular playback environment 600, as noted above. In this way, calibration of the particular playback 604 may be performed during the normal course of listening to media content.

Still further, the particular spectral data may include less spatial data than the spectral data obtained in some other calibration procedures. As discussed above with reference to FIG. 6, some calibrations may involve the control device 602 and it associated microphone being moved throughout the playback environment 600. As shown in FIG. 6, the control device 602 may be moved on the circuitous path 608 from point (a) to point (b), recording the spectral data at different spatial locations within the playback environment 600.

In contrast, calibration of the particular playback device 604 in the present example may not require the same degree of spatial sampling. For instance, the control device 602 may be moved on shorter, direct path from point (a) to point (b) while recording the audio playback data. Further, in some examples the control device 602 may not be moved within the particular playback environment 600 at all. Accordingly, this may facilitate a stationary microphone in the particular playback environment 600 capturing audio playback data during the calibration process. Thus, a microphone located on the particular playback device 604, or perhaps on another playback device, such as the playback device 606, may be used.

The amount of particular spectral data that is required to identify a substantial match with one of the representative spectral characteristic may be determined in a number of ways. For example, the computing device 610 may determine, based on the known distribution of representative spectral characteristics and a known calibration tone to be used, that a minimum of 10 seconds of particular spectral data is required to identify a matching representative spectral characteristic with 95% accuracy.

In other examples, the control device 602, or perhaps a playback device within with particular playback environment 600, may transmit the particular spectral data to the computing device 610 as it is captured during the calibration process. The computing device 610 may then determine, on an ongoing basis, the level of confidence in identifying a representative spectral characteristic that substantially matches the received particular spectral data. When the level of confidence reaches a threshold, such as 95%, the computing device 610 may transmit a message to one or both of the particular playback device 604 and the control device 602 that no more particular spectral data is required, and either the playback or recording, or both, may be discontinued accordingly. Other possibilities also exist.

It is possible that, in some instances, the computing device 610 may determine that the particular spectral data received from the particular playback device 604 does not substantially match any of the representative spectral characteristics in the database 800. For example, the particular playback environment may not be sufficiently similar to other playback environments in which playback devices have been calibrated, and the data obtained. In this situation, the user may be informed, via the control device, that his or her playback environment is unique. Further, the user may be prompted to initiate a calibration procedure "from scratch" that includes a more complete spectral analysis of the particular playback environment. Other examples are also possible.

At block 508, the computing device 610 may identify, in the database 800, an audio processing algorithm based on the identified representative spectral characteristic and at least one characteristic of the particular playback device 604. For instance, the computing device may identify the representative spectral characteristic $h_{room}^{-1}(t)-3$, corresponding to entry 801*c* in the database 800. Further, the computing device 610 may determine that the particular playback device 604 is a "PLAY: 3" model, corresponding to the entry 802*c* in the database 800. Based on this data, the computing device 610 may identify the audio processing algorithm at entry 803*c* in the database 800, represented by the coefficients $w_3$, $x_3$, $y_3$, and $z_3$.

Other examples are also possible. For instance, the database 800 may include other entries corresponding to representative spectral characteristic $h_{room}^{-1}(t)-3$ in conjunction with different playback device characteristics, such as an example in which the particular playback device 604 is a different model, such as a "PLAY: 5." This may result in the computing device 610 identifying a different audio processing algorithm within the database 800. As noted above, multiple playback device characteristics may be used in some cases.

At block 510, the computing device 610 may transmit, to the particular playback device 604, data indicating the identified audio processing algorithm. The particular playback device 604 may then apply the identified audio processing algorithm when playing back audio content in the particular playback environment 600.

In some cases, the computing device 610 may store an indication of the identified audio processing algorithm, which may be associated with the particular playback environment 600. This may allow the computing device 610 to transmit data indicating the identified audio processing algorithm to a second particular playback device corresponding to the particular playback environment 600, such as the playback device 606. In this way, the particular playback environment 600 may be calibrated once for the first particular playback device 604, and then the resulting audio processing algorithm may be transmitted to the second particular playback device 606 that may be currently located within the particular playback environment 600. A similar process may be used for a second playback device that may be later added to the particular playback environment 600.

In some examples, the playback device characteristics of the first and second particular playback devices might not be the same. In this situation, the computing device 610 may, based on the identified representative spectral characteristic and the playback device characteristic of the second particular playback device 606, update the identified audio processing algorithm and then transmit the updated audio processing algorithm to the second particular playback device 606. Alternatively, the computing device 610 may identify a different audio processing algorithm from the database 800. Other examples are also possible.

In another embodiment, the computing device 610 may cause an indication of the identified audio processing algorithm to be stored at the particular playback device 604. For example, the audio processing coefficients $w_3$, $x_3$, $y_3$, and $z_3$ may be stored in memory on the playback device 604. This may allow the particular playback device 604 to be moved to another playback environment and perhaps recalibrated, and then moved back to the particular playback environment 600. In this situation, the particular playback device 604 may apply the previously identified audio processing algorithm stored in its memory, and thus regain its previous calibration to the particular playback environment 600. Further, the particular playback device 604 may transmit the stored indication of the identified audio processing algorithm to other playback devices located within in the particular playback environment 600. Other examples are also possible.

b. Playback Device Self-Calibration Based on Representative Spectral Characteristics Combining several of the examples discussed above, an example playback device may perform a self-calibration based on representative spectral characteristics. The playback device may be, for example, the playback device 604 shown in FIG. 6, which may be similar to the playback device 200 shown in FIG. 2. The playback device 604 may include a processor 202, a microphone 220, and a non-transitory computer readable medium, such as memory 206. The memory 206 may include program instructions stored thereon that, when executed by the processor 202, cause the playback device 604 to perform functions such as those depicted in the flowchart 900 shown in FIG. 9.

For example, at block 902 of the method 900, the playback device 604 may play back first audio content in a playback environment, such as the playback environment 600. The first audio content may include a pre-determined calibration tone. Additionally or alternatively, the first audio content may include the playback of media content, as discussed above. For instance, the first audio content may be audio content that that playback device 604 is already playing, irrespective of any indication that a calibration procedure has been initiated.

At block 904, the playback device 604 may record, via the microphone 220, at least a portion of the played back first audio content. At block 906, the playback device 604 may transmit the recorded audio content to a computing device, such as the computing device 610 shown in FIG. 7. Further, the playback device 604 may also transmit playback device characteristic information to the computing device 610 that corresponds to the playback device 604.

The playback device characteristic information may include any of the information and data noted above, such as the date and time of a given calibration, the serial number of the playback device 604, the zone configuration of the playback device 604, the software version of the playback device 604, the hardware and software version of a control device 602 associated with the playback device 604, the user accounts associated with the playback device 604, playback history and associated data (genres, favorites, etc.) and any manual settings present on the playback device 204 at the time of calibration, such as a manually adjusted EQ. Numerous other examples are also possible.

In some examples, the computing device 604 may receive an indication from the computing device 610 that a particular duration of recorded audio content is to be recorded and transmitted. Alternatively, the playback device 604 may record and transmit recorded audio content to the computing device 610 continuously until it receives an indication from the computing device 610 that no further recorded audio content is required. In response, the playback device 604 may discontinue playback of the first audio content, discontinue recording the played back first audio content, or both.

At block 908, the playback device 604 may receive, from the computing device 610, data indicating an audio processing algorithm corresponding to the playback environment 600. The audio processing algorithm may be determined by the computing device 610 based on representative spectral characteristics, as well as one or more of the playback device characteristics transmitted by the playback device 604, according to the examples and discussion above.

Further, the computing device 604 may store the received indication of the audio processing algorithm corresponding to the playback environment 600 in memory 206. This may allow the playback device 604 to, for instance, recall the determined audio processing algorithm if it is moved and calibrated elsewhere, and then returned to the playback environment 600. Additionally, the playback device 604 may transmit data indicating the audio processing algorithm to other playback devices in the playback environment 600, such as playback device 606, as further discussed above.

At block 910, the playback device 604 may apply the audio processing algorithm while playing back second audio content in the playback environment 600. This may result in the calibration of the playback device 604 and an improved listening experience. As noted in the examples above, the calibration described may be performed by the playback 604 relatively quickly. In some cases, the calibration may also be relatively unnoticeable to a listener, as it may be performed during the normal course of playing back audio content.

In some examples, the playback device 604 may be configured to perform a self-calibration according to the examples above at a given time. For instance, the playback device 604 may perform a self-calibration every 6 months, or whenever it receives a software update, or whenever its zone configuration is updated. As another example, the playback device 604 may be configured to perform a self-calibration at a certain time of day, on a certain day of the week. For instance, playback device 604 may perform a self-calibration during the middle of the day, when nobody is expected to be present in the playback environment 600. In this situation, the playback device 604 may opt to self-calibrate using a pre-determined calibration tone, which may otherwise be disrupting if listeners are present. Numerous other examples, alone or in combination with those above, are also possible

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples involve calibrating a playback device based on representative spectral characteristic data. In one aspect, a method is provided. The method involves maintaining, by a computing device, a database of representative spectral characteristics and receiving, by the computing device, particular spectral data associated with a particular playback environment corresponding to the particular playback device. The method also involves, based on the particular spectral data, identifying one of the representative spectral characteristics from the database that substantially matches the particular spectral data and identifying, in the database, an audio processing algorithm based on a) the identified representative spectral characteristic and b) at least one characteristic of the particular playback device. Further, the method also involves transmitting, to the particular playback device, data indicating the identified audio processing algorithm.

In another aspect, a computing device is provided. The device includes a processor, a non-transitory computer readable medium, and program instructions stored on the non-transitory computer readable medium that, when executed by the processor, cause the computing device to perform functions. The functions include maintaining a database of representative spectral characteristics and receiving particular spectral data associated with a particular playback environment corresponding to a particular playback device. The functions also include, based on the particular spectral data, identifying one of the representative spectral characteristics from the database that substantially matches the particular spectral data and identifying, in the database, an audio processing algorithm based on a) the identified representative spectral characteristic and b) at least one characteristic of the particular playback device. Further, the functions include transmitting, to the particular playback device, data indicating the identified audio processing algorithm.

In yet another aspect, a playback device is provided. The device includes a processor, a microphone, a non-transitory computer readable medium, and program instructions stored on the non-transitory computer readable medium that, when executed by the processor, cause the playback device to perform functions. The functions include playing back first audio content in a playback environment and recording, via the microphone, at least a portion of the played back first audio content. The functions also include transmitting the recorded audio content to a computing device and receiving, from the computing device, data indicating an audio processing algorithm corresponding to the playback environment. Further, the functions include applying the audio processing algorithm while playing back second audio content in the playback environment.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:

a network interface;

a microphone;

at least one processor;

a housing carrying the network interface, the microphone, and the at least one processor; and at least one non-transitory computer-readable medium comprising program instructions that are executable by the at least one processor such that the computing device is configured to:

during playback of audio content by a playback device via at least one audio transducer in an environment, capture, via the microphone, microphone data representing at least a portion of the audio content played back by the playback device, wherein the microphone data: (1) includes audio in a first sub-range of a frequency range and a second sub-range of the frequency range and (2) excludes audio in one or more third sub-ranges of the frequency range, wherein the at least one audio transducer of the playback device is configured to reproduce audio over at least the frequency range;

determine spectral data based on portions of the captured microphone data in the first sub-range of the frequency range;

identify a stored audio processing algorithm corresponding to the determined spectral data, the identified audio processing algorithm at least partially offsetting acoustic characteristics of the environment across the frequency range, wherein the acoustic characteristics of the environment comprise at least one first acoustic characteristic within the second sub-range and at least one second acoustic characteristic within the one or more third sub-ranges; and calibrate the playback device with the identified audio processing algorithm.

2. The computing device of claim 1, wherein the instructions that are executable by the at least one processor such that the computing device is configured to identify the stored audio processing algorithm comprise instructions that are executable by the at least one processor such that the computing device is configured to:

identify a particular spectral characteristic that approximates the environment based on the determined spectral data, and identify, in a database, the stored audio processing algorithm based on the identified particular spectral characteristic.

3. The computing device of claim 2, wherein the database is stored in data storage of one or more servers, and wherein the instructions that are executable by the at least one processor such that the computing device is configured to identify the stored audio processing algorithm comprise instructions that are executable by the at least one processor such that the computing device is configured to:

query, via the network interface, the database for the stored audio processing algorithm including a database relation to the particular spectral characteristic.

4. The computing device of claim 3, wherein the instructions that are executable by the at least one processor such that the computing device is configured to query the database for the stored audio processing algorithm comprise instructions that are executable by the at least one processor such that the computing device is configured to:

query, via the network interface, the database for the stored audio processing algorithm including a database relation to (i) the particular spectral characteristic and (ii) a characteristic of the playback device.

5. The computing device of claim 3, wherein the program instructions that are executable by the at least one processor such that the computing device is configured to calibrate the playback device with the identified audio processing algorithm comprise program instructions that are executable by the at least one processor such that the computing device is configured to:

cause the one or more servers to send data representing the identified audio processing algorithm to the playback device.

6. The computing device of claim 1, wherein the instructions that are executable by the at least one processor such that the computing device is configured to determine spectral data based on portions of the captured microphone data in the first sub-range of the frequency range comprise instructions that are executable by the at least one processor such that the computing device is configured to:

determine, from the portions of the captured microphone data, a frequency response across the first sub-range of the frequency range.

7. The computing device of claim 1, wherein the microphone has a microphone response curve, and wherein the microphone response curve is sensitive to the first sub-range of the frequency range.

8. The computing device of claim 1, wherein the at least one non-transitory computer-readable medium further comprises program instructions that are executable by the at least one processor such that the computing device is configured to:

capture, via the microphone, additional microphone data representing (i) at least an additional portion of the audio content played back by the playback device and (ii) a voice input.

9. The computing device of claim 1, wherein the program instructions that are executable by the at least one processor such that the computing device is configured to calibrate the playback device with the identified audio processing algorithm comprise program instructions that are executable by the at least one processor such that the computing device is configured to:

send data representing the identified audio processing algorithm to the playback device.

10. A system comprising:

a computing device comprising a microphone;

at least one processor; and at least one non-transitory computer-readable medium comprising program instructions that are executable by the at least one processor such that the system is configured to:

during playback of audio content by a playback device via at least one audio transducer in an environment, capture, via the microphone, microphone data representing at least a portion of the audio content played back by the playback device, wherein the microphone data: (1) includes audio in a first sub-range of a frequency range and a second sub-range of the frequency range and (2) excludes audio in one or more third sub-ranges of the frequency range, wherein the at least one audio transducer of the playback device is configured to reproduce audio over at least the frequency range;

determine spectral data based on portions of the captured microphone data in the first sub-range of the frequency range;

identify a stored audio processing algorithm corresponding to the determined spectral data, the identified audio processing algorithm at least partially offsetting acoustic characteristics of the environment across the frequency range, wherein the acoustic characteristics of the environment comprise at least one first acoustic characteristic within the second sub-range and at least one second acoustic characteristic within the one or more third sub-ranges; and calibrate the playback device with the identified audio processing algorithm.

11. The system of claim 10, wherein the instructions that are executable by the at least one processor such that the system is configured to identify the stored audio processing algorithm comprise instructions that are executable by the at least one processor such that the system is configured to:

identify a particular spectral characteristic that approximates the environment based on the determined spectral data, and identify, in a database, the stored audio processing algorithm based on the identified particular spectral characteristic.

12. The system of claim 11, wherein the database is stored in data storage of one or more servers, and wherein the instructions that are executable by the at least one processor such that the system is configured to identify the stored audio processing algorithm comprise instructions that are executable by the at least one processor such that the system is configured to:

query, via a network interface, the database for the stored audio processing algorithm including a database relation to the particular spectral characteristic.

13. The system of claim 12, wherein the instructions that are executable by the at least one processor such that the system is configured to query the database for the stored audio processing algorithm comprise instructions that are executable by the at least one processor such that the system is configured to:

query, via the network interface, the database for the stored audio processing algorithm including a database relation to (i) the particular spectral characteristic and (ii) a characteristic of the playback device.

14. The system of claim 12, wherein the program instructions that are executable by the at least one processor such that the system is configured to calibrate the playback device with the identified audio processing algorithm comprise program instructions that are executable by the at least one processor such that the system is configured to:

cause the one or more servers to send data representing the identified audio processing algorithm to the playback device.

15. The system of claim 10, wherein the instructions that are executable by the at least one processor such that the system is configured to determine spectral data based on portions of the captured microphone data in the first sub-range of the frequency range comprise instructions that are executable by the at least one processor such that the system is configured to:

determine, from the portions of the captured microphone data, a frequency response across the first sub-range of the frequency range.

16. The system of claim 10, wherein the microphone has a microphone response curve, and wherein the microphone response curve is sensitive to the first sub-range of the frequency range.

17. The system of claim 10, wherein the at least one non-transitory computer-readable medium further comprises program instructions that are executable by the at least one processor such that the system is configured to:

capture, via the microphone, additional microphone data representing (i) at least an additional portion of the audio content played back by the playback device and (ii) a voice input.

18. The system of claim 10, wherein the program instructions that are executable by the at least one processor such that the system is configured to calibrate the playback device with the identified audio processing algorithm comprise program instructions that are executable by the at least one processor such that the system is configured to:

send data representing the identified audio processing algorithm to the playback device.

19. At least one non-transitory computer-readable medium comprising program instructions that are executable by at least one processor such that a computing device is configured to:

during playback of audio content by a playback device via at least one audio transducer in an environment, capture, via a microphone, microphone data representing at least a portion of the audio content played back by the playback device, wherein the microphone data: (1) includes audio in a first sub-range of a frequency range and a second sub-range of the frequency range and (2) excludes audio in one or more third sub-ranges of the frequency range, wherein the at least one audio transducer of the playback device is configured to reproduce audio over at least the frequency range;

determine spectral data based on portions of the captured microphone data in the first sub-range of the frequency range;

identify a stored audio processing algorithm corresponding to the determined spectral data, the identified audio processing algorithm at least partially offsetting acoustic characteristics of the environment across the frequency range, wherein the acoustic characteristics of the environment comprise at least one first acoustic characteristic within the second sub-range and at least one second acoustic characteristic within the one or more third sub-ranges; and calibrate the playback device with the identified audio processing algorithm.

20. The at least one non-transitory computer-readable medium of claim 19, wherein the instructions that are executable by the at least one processor such that the computing device is configured to identify the stored audio processing algorithm comprise instructions that are executable by the at least one processor such that the computing device is configured to:

identify a particular spectral characteristic that approximates the environment based on the determined spectral data, and identify, in a database, the stored audio processing algorithm based on the identified particular spectral characteristic.

* * * * *